US012599940B2

(12) United States Patent
Paprocki et al.

(10) Patent No.: US 12,599,940 B2
(45) Date of Patent: Apr. 14, 2026

(54) DRAIN CLEANER TOOL

(71) Applicant: Milwaukee Electric Tool Corporation, Brookfield, WI (US)

(72) Inventors: Benjamin J. Paprocki, Cottage Grove, WI (US); Benjamin T. Jones, St. Francis, WI (US); Aaron M. Williams, Milwaukee, WI (US); Nicole Z. Summersett, Milwaukee, WI (US); Jack R. Warning, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 518 days.

(21) Appl. No.: 18/066,142

(22) Filed: Dec. 14, 2022

(65) Prior Publication Data

US 2023/0124234 A1 Apr. 20, 2023

Related U.S. Application Data

(63) Continuation of application No. PCT/US2022/078224, filed on Oct. 17, 2022.

(Continued)

(51) Int. Cl.
*B08B 9/045* (2006.01)
*E03C 1/302* (2006.01)

(52) U.S. Cl.
CPC .............. *B08B 9/045* (2013.01); *E03C 1/302* (2013.01); *B08B 2209/04* (2013.01)

(58) Field of Classification Search
CPC ....... B08B 9/045; B08B 2209/04; B08B 9/02; B08B 9/04; B08B 9/047; E03C 1/302; E03F 9/005

(Continued)

(56) References Cited

U.S. PATENT DOCUMENTS

| | | | |
|---|---|---|---|
| 1,912,525 | A | 6/1933 | Hotchkiss, Jr. |
| 2,470,225 | A | 5/1949 | Silverman |

(Continued)

FOREIGN PATENT DOCUMENTS

| | | |
|---|---|---|
| CN | 101180139 | 5/2008 |
| CN | 102080403 | 6/2011 |

(Continued)

OTHER PUBLICATIONS

International Search Report and Written Opinion for International Application No. PCT/US2022/078224, dated Feb. 8, 2023, 12 pages.

(Continued)

*Primary Examiner* — Katina N. Henson
*Assistant Examiner* — Sharonda T Felton
(74) *Attorney, Agent, or Firm* — Reinhart Boerner Van Deuren s.c.

(57) ABSTRACT

A tool for opening or removing a blockage from a drain is shown. In one embodiment, the drain cleaning tool includes a drum, a spinning handle, a support handle, a cable, and a cable lock assembly. The spinning handle is coupled to the drum and rotatable to coil the cable after use of the drain cleaning tool. The support handle is positioned between the drum and a tip of the drain cleaning tool. In another embodiment, the drain cleaning tool includes a tip portion, a body, a handle, and a cable. The drain cleaning tool further includes a flexible portion of the cable and retention mechanism such that the drain cleaning tool can be folded.

12 Claims, 23 Drawing Sheets

Related U.S. Application Data

(60) Provisional application No. 63/374,087, filed on Aug. 31, 2022, provisional application No. 63/396,049, filed on Aug. 8, 2022, provisional application No. 63/284,346, filed on Nov. 30, 2021, provisional application No. 63/256,830, filed on Oct. 18, 2021.

(58) Field of Classification Search
USPC ........................................................ 15/104.33
See application file for complete search history.

(56) References Cited

U.S. PATENT DOCUMENTS

| | | | | |
|---|---|---|---|---|
| 3,727,261 | A | 4/1973 | Levine | |
| 3,882,565 | A * | 5/1975 | Irwin | B08B 9/045 15/104.33 |
| 3,983,593 | A * | 10/1976 | Naeve | E03F 9/005 254/134.3 FT |
| 4,706,321 | A | 11/1987 | Kaye | |
| 4,763,374 | A | 8/1988 | Kaye | |
| 4,793,017 | A | 12/1988 | Kaye | |
| 5,018,234 | A | 5/1991 | Meyer et al. | |
| 5,020,166 | A | 6/1991 | Davenport | |
| 5,261,128 | A | 11/1993 | Davenport | |
| 5,265,301 | A | 11/1993 | Irwin | |
| 5,287,564 | A | 2/1994 | Davenport | |
| 5,537,694 | A | 7/1996 | Davenport | |
| 5,546,613 | A | 8/1996 | Davenport | |
| 5,588,171 | A | 12/1996 | Hamann | |
| 5,615,844 | A | 4/1997 | Bosch | |
| 5,787,516 | A | 8/1998 | Davenport | |
| 6,158,076 | A | 12/2000 | Rutkowski et al. | |
| 6,163,895 | A | 12/2000 | Davenport | |
| 6,615,436 | B1 | 9/2003 | Burch, Jr. et al. | |
| 7,269,874 | B2 | 9/2007 | Hung | |
| 7,367,077 | B2 | 5/2008 | Rutkowski et al. | |
| 7,765,626 | B2 | 8/2010 | Sapia | |
| 8,312,572 | B2 | 11/2012 | Heffner | |
| 8,434,186 | B2 | 5/2013 | Wildauer et al. | |
| 8,826,483 | B2 | 9/2014 | Rutkowski et al. | |
| 9,234,342 | B1 | 1/2016 | Beesley et al. | |
| 9,260,847 | B2 | 2/2016 | Silverman et al. | |
| 9,683,356 | B1 | 6/2017 | Selius | |
| 9,884,353 | B2 | 2/2018 | Banholzer et al. | |
| 9,975,154 | B1 | 5/2018 | Banholzer et al. | |
| 10,071,401 | B2 | 9/2018 | Dunkin et al. | |
| 10,189,060 | B2 | 1/2019 | Hsu | |
| 10,239,100 | B2 | 3/2019 | Banholzer et al. | |
| 10,443,225 | B2 | 10/2019 | Hoyt | |
| 10,465,372 | B2 | 11/2019 | Bowles et al. | |
| 10,486,207 | B2 | 11/2019 | Kehoe et al. | |
| 10,501,927 | B2 | 12/2019 | Pleasants | |
| 10,519,646 | B2 | 12/2019 | Pleasants | |
| 10,612,230 | B2 | 4/2020 | Hsu | |
| 10,704,250 | B2 | 7/2020 | Scott et al. | |
| D910,251 | S | 2/2021 | Lan et al. | |
| 10,987,708 | B2 | 4/2021 | Szucs et al. | |
| 11,103,902 | B2 | 8/2021 | Banholzer et al. | |
| 11,185,897 | B2 | 11/2021 | Davies et al. | |
| 11,185,898 | B2 | 11/2021 | Kehoe et al. | |
| 2007/0033752 | A1 | 2/2007 | Hung | |
| 2011/0056007 | A1 | 3/2011 | Caywood | |
| 2018/0051454 | A1 | 2/2018 | Hoyt | |
| 2018/0126428 | A1 | 5/2018 | Hsu | |
| 2020/0047223 | A1 | 2/2020 | Kehoe et al. | |
| 2020/0080293 | A1 | 3/2020 | Krohlow | |
| 2020/0208394 | A1 | 7/2020 | Puzio et al. | |
| 2020/0291632 | A1 | 9/2020 | Scott et al. | |
| 2020/0298291 | A1 | 9/2020 | Hesse et al. | |
| 2021/0159818 | A1 | 5/2021 | Moghe et al. | |
| 2021/0172162 | A1 | 6/2021 | Cole et al. | |
| 2021/0205863 | A1 | 7/2021 | Rutkowski et al. | |
| 2021/0222419 | A1 | 7/2021 | Wang | |
| 2021/0346921 | A1 | 11/2021 | Banholzer et al. | |
| 2022/0080472 | A1 | 3/2022 | Davies et al. | |
| 2022/0088649 | A1 | 3/2022 | Kehoe et al. | |
| 2022/0098849 | A1 * | 3/2022 | Berg, Jr. | E03F 9/005 |

FOREIGN PATENT DOCUMENTS

| | | |
|---|---|---|
| CN | 203669052 | 6/2014 |
| CN | 105507384 | 4/2016 |
| CN | 207194093 | 4/2018 |
| CN | 108691355 | 10/2018 |
| CN | 305607885 | 2/2020 |
| CN | 210730427 | 6/2020 |
| CN | 109719091 | 3/2021 |
| CN | 108368699 | 4/2021 |
| CN | 113026928 | 6/2021 |
| CN | 213329375 | 6/2021 |
| CN | 113263032 | 8/2021 |
| CN | 113595448 | 11/2021 |
| CN | 113877902 | 1/2022 |
| CN | 216007239 | 3/2022 |
| DE | 2613944 | 7/1981 |
| DE | 102010013252 | 7/2017 |
| DE | 102021201374 | 8/2021 |
| DE | 102021201359 | 11/2021 |
| EP | 0428509 | 1/1996 |
| EP | 1871548 | 1/2008 |
| EP | 2371462 | 5/2014 |
| EP | 3385002 | 10/2018 |
| EP | 3387194 | 10/2018 |
| EP | 3476498 | 5/2019 |
| EP | 3735497 | 11/2020 |
| WO | WO9001380 | 2/1990 |
| WO | WO06096522 | 9/2006 |
| WO | WO06112847 | 10/2006 |
| WO | WO08043089 | 4/2008 |
| WO | WO 2010-065106 | 6/2010 |
| WO | WO16106110 | 6/2016 |
| WO | WO17100653 | 6/2017 |
| WO | WO19096353 | 5/2019 |
| WO | WO19136362 | 7/2019 |
| WO | WO20055939 | 3/2020 |
| WO | WO22072557 | 4/2022 |

OTHER PUBLICATIONS

Drain Snakes, <https://www.homedepot.com/b/Plumbing-Drain-Openers-Drain-Snakes/25/N-5yc1vZbqoeZ1z0vhuj>, believed to be commercially available at least by Sep. 24, 2021, Retrieved on Nov. 4, 2022, 35 pages.

RIDGID, Kwik-Spin+ ¼ in. ×25 ft. Drain Cleaning Snake Auger with Autofeed Trigger for Kitchen/Bath Sinks and Tubs/Showers <https://www.homedepot.com/p/RIDGID-KwikSpin-1-4-in-x-25-ft-Auger-57038/303644603>, believed to be commercially available at least by Sep. 24, 2021, Retrieved on Nov. 4, 2022, 5 pages.

RIDGID, Power Spin+ ¼ in. ×25 ft. Hybrid Drain Cleaning Snake Auger (Manual or Cordless Drill Operated, Tool Only), < https://www.homedepot.com/p/RIDGID-PowerSpin-Plus-57043/303644607?MERCH=REC-_-pipsem-_-303644603-_-303644607-_-N>, believed to be commercially available at least by Sep. 24, 2021, Retrieved on Nov. 4, 2022, 5 pages.

* cited by examiner

DRAIN CLEANER TOOL

CROSS-REFERENCE TO RELATED PATENT APPLICATIONS

The present application is a continuation of International Application No. PCT/US2022/078224, filed Oct. 17, 2022 and claims the benefit of and priority to U.S. Provisional Application No. 63/374,087, filed on Aug. 31, 2022, to U.S. Provisional Application No. 63/396,049, filed Aug. 8, 2022, to U.S. Provisional Application No. 63/284,346, filed on Nov. 30, 2021, and U.S. Provisional Application No. 63/256,830, filed Oct. 18, 2021, which are incorporated herein by reference in their entireties.

BACKGROUND OF THE INVENTION

The present disclosure is directed generally to the field of tools. The present invention relates specifically to drain cleaner tools.

SUMMARY OF THE INVENTION

One embodiment of the invention relates to a drain cleaning tool including a drum, an elongated tube and a cable lock assembly. The elongated tube extends from the drum along a longitudinal axis of the drain cleaning tube and includes an opening at a distal end from the drum. The cable lock assembly is coupled to the distal end of the elongated tube. The cable lock assembly includes a tip portion with a first end positioned at the distal end of the elongated tube and a second end opposing the first end. The second end of the tip portion includes an exit opening. The cable lock assembly further includes an actuator rotatably engaged with the tip portion and extending along the longitudinal axis of the drain cleaning tool. The drain cleaning tool further includes a cable stored within the drum and configured to extend through the elongated tube and the tip portion. The actuator is rotatable about the longitudinal axis of the drain cleaning tool between an unlocked position in which the cable is moveable with respect to the tip portion and a locked position in which the cable is fixed with respect to the tip portion.

Another embodiment of the invention relates to a drain cleaning tool including a drum, an elongated tube and a cable lock assembly. The elongated tube extends from the drum along a longitudinal axis of the drain cleaning tube and includes an opening at a distal end from the drum. The cable lock assembly is coupled to the distal end of the elongated tube. The cable lock assembly includes a tip portion with a first end positioned at the distal end of the elongated tube and a second end opposing the first end. The second end of the tip portion includes an exit opening. The cable lock assembly further includes an actuator rotatably engaged with the tip portion. The actuator includes an actuator channel extending along the longitudinal axis of the drain cleaning tool. The drain cleaning tool further includes a cable positioned within the drum and configured to extend through the elongated tube and the exit opening into a drain. The actuator is rotatable about the longitudinal axis of the drain cleaning tool between an unlocked position in which a longitudinal actuator axis is collinear with the longitudinal axis of the drain cleaning tool such that the cable is moveable within the actuator channel and a locked position in which the longitudinal actuator axis is parallel to and not collinear to the longitudinal axis of the drain cleaning tool such that the cable is pressed between an inner surface of the actuator channel and an inner surface of the elongated tube to lock the cable in place.

Another embodiment of the invention relates to a drain cleaning tool including a body, a folding mechanism, and a tip portion. The body extends along a longitudinal axis of the drain cleaning tool and includes a passageway extending through the body, an upper portion with an opening connected to the passageway and a lower portion. The folding mechanism includes a coupler positioned between the upper portion of the body and the lower portion of the body. The folding mechanism further includes a tube located within the coupler and connecting the upper portion of the body and the lower portion of the body and a pin configured to engage the coupler. The tip portion is coupled to a distal end of the lower portion of the body and includes an exit opening. The drain cleaning tool further includes a cable configured to extend through the passageway of the body and the exit opening of the tip portion into a drain. The drain cleaning tool is moveable between an extended position in which the pin is engaged with the coupler to fix a position of the coupler with respect to the body such that the tube is compressed and a folded position in which the pin is disengaged from the coupler such that the tube expands, and a length defined between the upper portion of the body and a lower portion of the body is increased.

Another embodiment of the invention relates to a drain cleaning tool including a body, a folding mechanism, and a tip portion. The body extends along a longitudinal axis of the drain cleaning tool and includes a passageway extending through the body, an upper portion with an opening connected to the passageway and a lower portion. The folding mechanism includes a coupler positioned between the upper portion of the body and the lower portion of the body. The folding mechanism further includes a tube located within the coupler and connecting the upper portion of the body and the lower portion of the body and a pin configured to engage the coupler. The tip portion is coupled to a distal end of the lower portion of the body and includes an exit opening. The drain cleaning tool further includes a cable configured to extend through the passageway of the body and the exit opening of the tip portion into a drain. The folding mechanism is moveable between an extended position in which the pin engages the coupler to fix a position of the coupler with respect to the body such that the upper portion of the body and the lower portion of the body are aligned along the longitudinal axis of the drain cleaning tool and a folded position in which the pin is disengaged from the coupler, allowing the lower portion of the body to rotate into a position where the upper portion of the body and the lower portion of the body are not aligned along the longitudinal axis of the drain cleaning tool.

In a specific embodiment of the invention, the support handle is adjustable and rotatable. In another specific embodiment, the support handle includes a curved shape that extends towards the drum and then curves toward the distal end. In such an embodiment, an end surface of the support handle generally faces the same direction as the distal end of the drain cleaning tool. In another specific embodiment, the support handle is located over the center of gravity of drain cleaning tool. In another specific embodiment, the support handle is located slightly forward of the center of gravity of the drain cleaning tool.

In a specific embodiment of the invention, the spinning handle is foldable such that the size of the drain cleaning tool is reduced for storage. In such an embodiment, the spinning handle forms a flat surface such that the drain cleaning tool can be stored with the spinning handle outer surface located on a support surface (ground, table, etc.).

In another specific embodiment of the invention, when the actuator is in the locked position, a through bore of the actuator is offset (i.e., not aligned) from the elongated tube and/or the opening at the distal end and a channel extending through the end portion of the neck. When the actuator is moved to the locked position, the offset creates a reduction in a dimension of the through bore which in turn presses and/or pushes the cable between a wall of the actuator and a wall of the elongated tube, locking the cable in place such that the cable is prevented from moving rotationally and/or axially. When the actuator is in the second, unlocked position the through bore of the actuator is in line with the elongated tube, the opening at the distal end of the drain cleaning tool and/or the channel of end portion such that the cable is free to move rotationally and/or axially.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a drain cleaning tool are shown. As discussed herein, Applicant has developed a number of improvements to drain cleaning tools. In contrast to the drain snake tool discussed herein, many powered or hand drain snake tools include large drum portions and/or handles to drive the cleaning cables. Applicant believes the drain cleaning tool including a small diameter drum without an extended handle allows for use in compact spaces (e.g., under sinks, close to walls or other plumbing fixtures). Further, Applicant has designed a hose opening and foldout plug that together allow for easy cleaning and containment of the dirty cable after use of the drain snake.

In contrast to the various drain augers discussed herein, many augers have an extended body or rigid portion that may make maneuvering or carrying the drain auger without causing damage difficult (e.g., scratch walls, bump objects etc.). Applicant believes the drain auger including a folding mechanism with a flexible or foldable portion and a rigid portion that may be clipped to the auger body allows for easier transport and storage. For example, an auger with the discussed folding mechanism may allow for a functionally 6 foot auger to be folded and stored with a length of 3-4 feet. Further, Applicant has designed a funnel portion with an opening to allow for easy cleaning of the drain auger. Additionally, Applicant believes the longer boot portion of the flexible tip of the auger prevents accidental scratching or chipping of bath fixtures (e.g., porcelain toilet bowl, bathtub, etc.). The longer boot allows for the cable or coil to fully nest or reside within the flexible tip, in contrast to many augers where the cable end or bulb extends beyond the tip of the auger leaving the potential for fixture damage.

Figure 1:
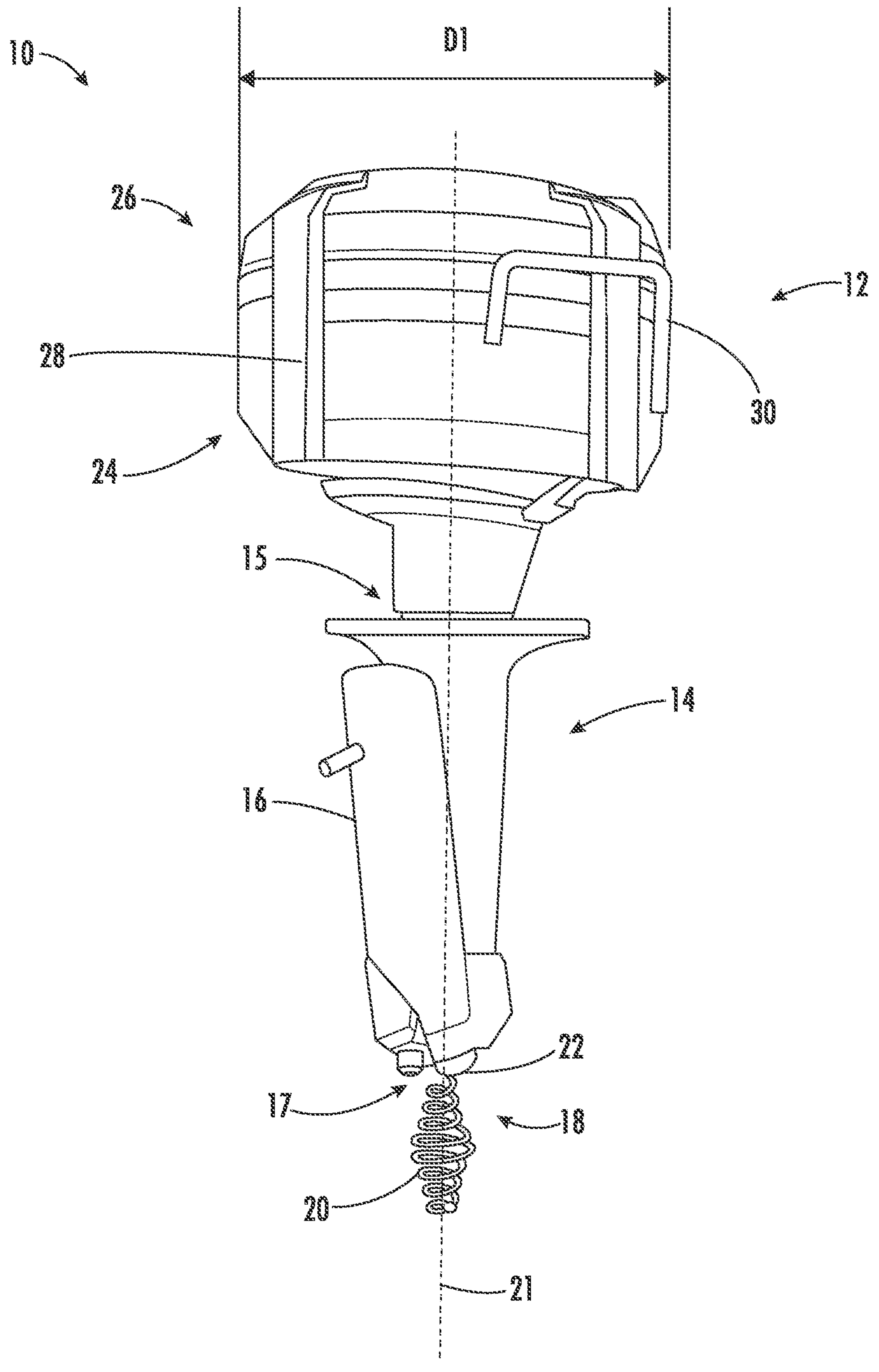
FIG. 1 is a left-side perspective view of a drain snake tool, according to an exemplary embodiment.
Figure 2:
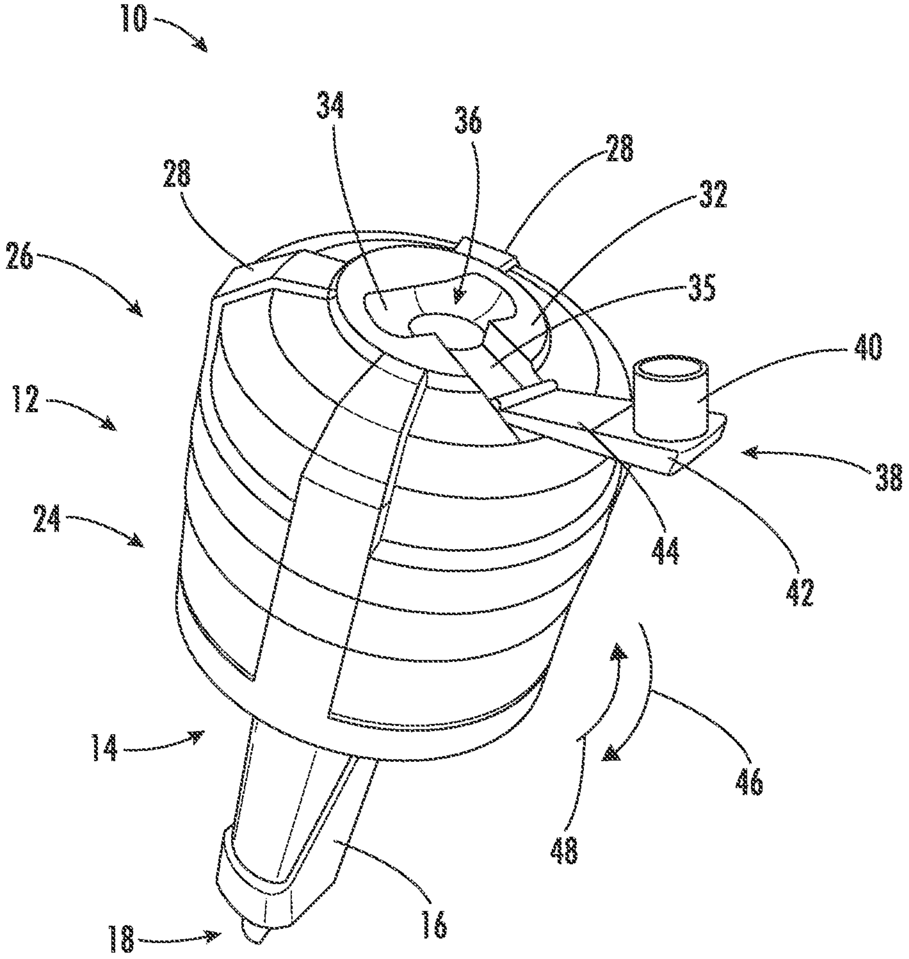
FIG. 2 is a top perspective view of the drain snake tool of FIG. 1, according to an exemplary embodiment.

Referring to FIGS. 1-2, various aspects of a drain cleaning tool, shown as a drain snake 10, are shown. Drain snake 10 includes a drum 12, a drum shield 14, a handle 16, and a cable or coil 18. Drum 12 includes a first or lower portion 24 coupled to a second or upper portion 26. The drum 12 is positioned at least partially within drum shield 14 and specifically within an elongated tube or passageway 15 that extends through drum shield 14 and/or handle 16. The drum shield 14 is used to protect the drum 12 and to protect fixtures (e.g., sink, bathtub, toilet, etc.) from damage (e.g., scratching, chipping, etc.) caused by the spinning drum 12. The drum 12 is configured to rotate within the drum shield 14 causing rotation of cable 18.

Drum 12 further includes a plurality of side extrusions 28 that extend radially outward from drum 12. Side extrusions 28 allow a user to grip and rotate drum 12 during drain cleaning. Drum 12 is rotatable in a clockwise direction, shown by arrow 46 and a counterclockwise direction, shown by arrow 48. As drum 12 rotates, cable 18 rotates, allowing cable 18 to move around curves within the drain and also to clean/unblock the drain. Cable 18 is formed from a flexible material and stored within drum 12 (e.g., wound around a reel) when drain snake 10 is not in use. Cable 18 extends through passageway 15 and exits drum shield 14 and/or handle 16 through an opening 17 at an end distal from drum 12 so that cable 18 can extend into a drain. In a specific embodiment, cable 18 includes a narrower cable portion 22 and an end or bulb portion 20 that can be used to break through or retrieve objects or debris (e.g., hair) causing blockage within a drain or pipes. In other embodiments, cable 18 may not include a bulb portion or include another attachment tool at the distal end. In specific embodiments, cable 18 has a length between 15 to 35 feet, and specifically about 25 feet (e.g., 25 feet plus or minus 1 foot).

Cable 18 is fed through drain snake 10 and specifically through drum 12, drum shield 14 and/or handle 16 along a longitudinal axis 21 of drain snake 10. Cable 18 is extended out of opening 17 in a first direction, along longitudinal axis 21 into the drain by moving linearly. Similarly, cable 18 can be retracted into opening 17 and passageway 15 when moved linearly in a second direction, opposite the first direction and along the longitudinal axis 21. Handle 16 includes internal fingers or projections. When handle 16 is actuated, the cable 18 is automatically fed through drum shield 14 and out opening 17.

Drum 12 further includes a central surface 32 on upper portion 26. Central surface 32 is centered about longitudinal axis 21 and an upper portion of side extrusions 28 extend radially outward from central surface 32. A cap recess 34 is defined within central surface 32. An opening, shown as a hose opening 36 is centered about longitudinal axis 21 and defined within cap recess 34. Hose opening 36 provides a passage into an interior of drum 12 and is sized to receive at least a portion of a hose or tubing. After use of drain snake 10, a hose can be placed in hose opening 36 such that when water is turned on, drum 12 and drain snake 10 can be cleaned. A handle recess 35 is at least partially defined within central surface 32. Handle recess 35 extends in a generally perpendicular (e.g., 90°±10°) orientation relative to cap recess 34.

Drain snake 10 further includes a foldout cap 38 configured to interface with cap recess 34, handle recess 35, and opening 36 respectively to plug opening 36. Foldout cap 38 includes a plug portion 40 extending away from a base 42. Base 42 is coupled to a handle portion 44. Handle portion 44 has a major axis in a generally perpendicular orientation to a major axis of base 42. Foldout cap 38 is pivotably coupled within handle recess 35. Foldout cap 38 is moveable between a first position in which foldout cap 38 plugs/blocks opening 36 and a second position in which opening 36 is unblocked. When foldout cap 38 is in a closed position, handle portion 44 is received within handle recess 35, base 42 is received within cap recess 34, and plug portion 40 is received within opening 36 such that drum 12 is sealed when foldout cap 38 is in a closed position. The ability to seal drum 12 after use of drain snake 10 allows a user to set down the tool while preventing debris (e.g., the drain blockage) or liquid on cable 18 from escaping drum 12.

In a specific embodiment, a hook, shown as a rafter hook 30 is coupled to drum 12. Rafter hook 30 allows for easy storage of drain snake 10 (e.g., can hand up in garage, workshop, etc.). As shown in FIG. 1, drum 12 includes a diameter, shown as D1. The diameter D1 of drum 12 allows for drain snake 10 to be used in compact spaces (e.g., under sinks, close to walls or other plumbing fixtures) where other drain cleaning tools may be too large to use or fit comfortably without damaging walls or surrounding plumbing fixtures.

Figure 3:
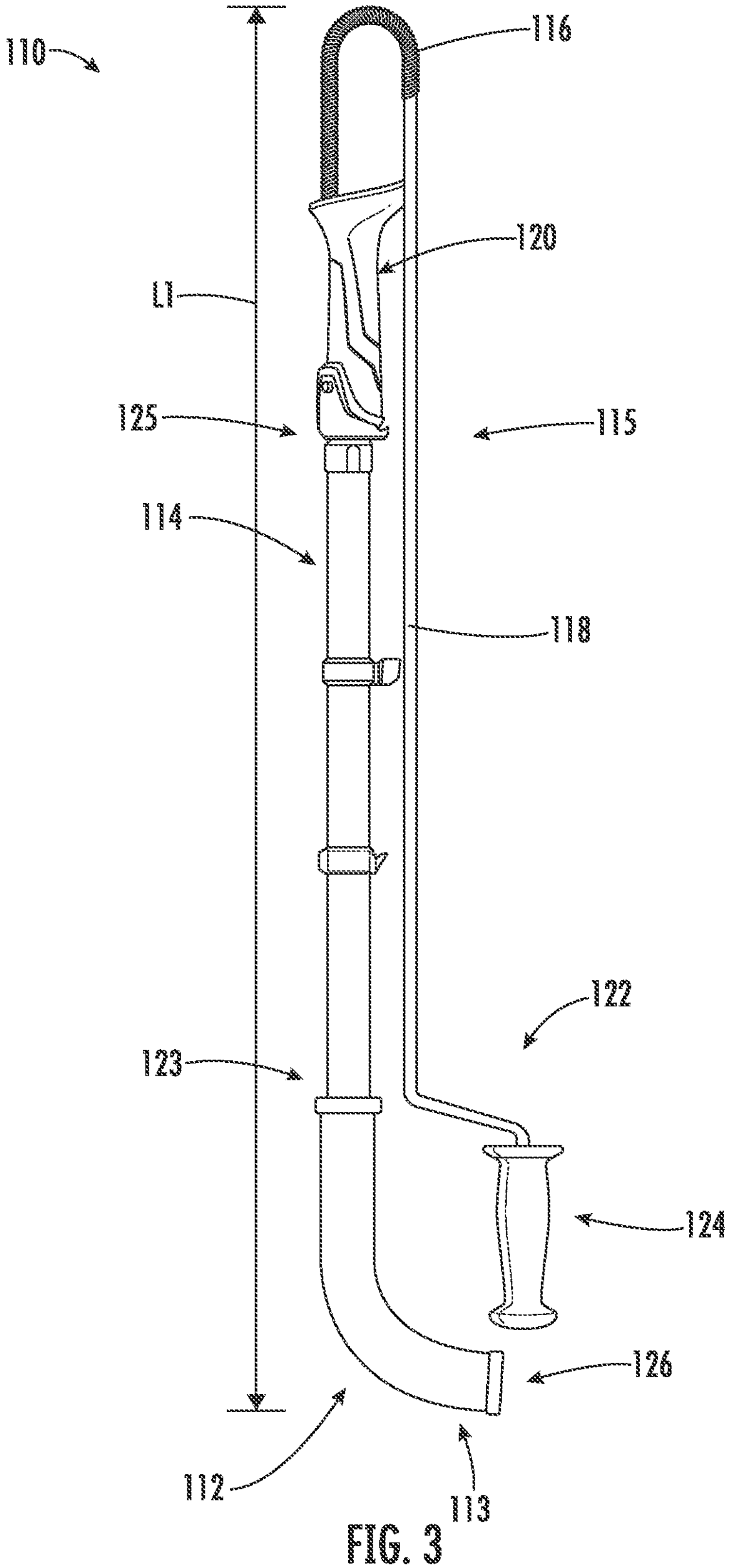
FIG. 3 is a right-side perspective view of a drain auger, according to another exemplary embodiment.
Figure 4:
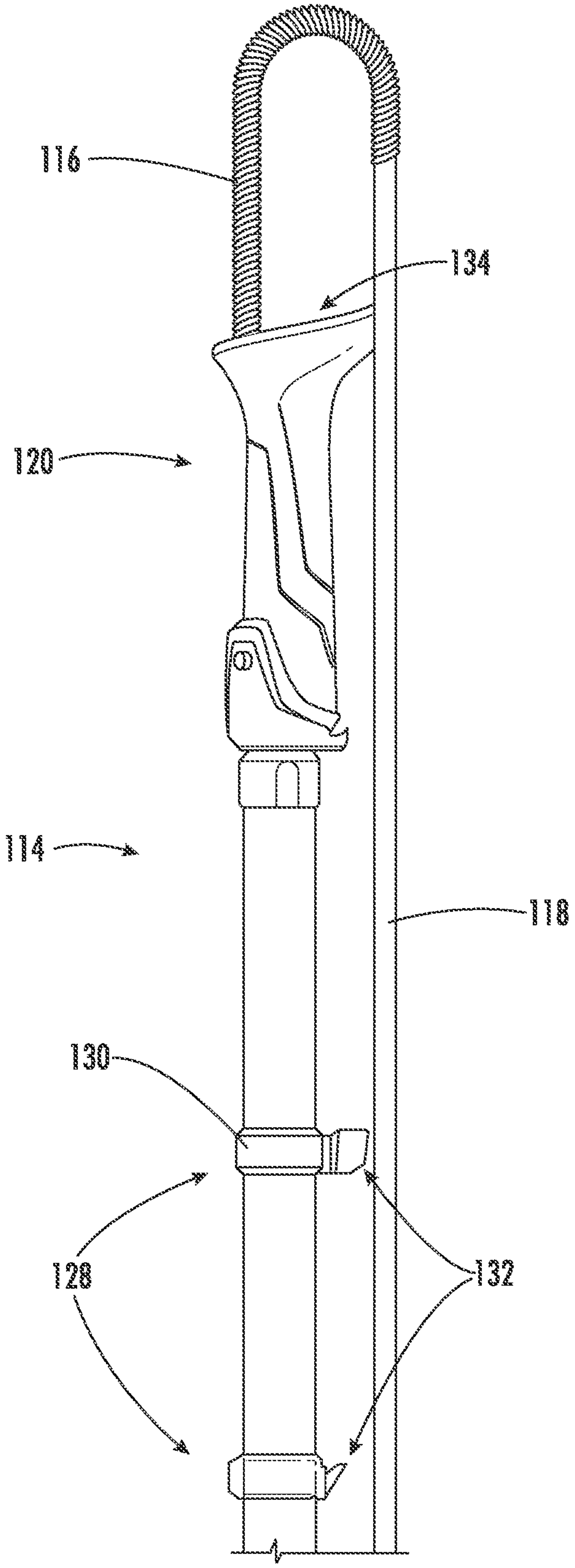
FIG. 4 is a detailed perspective view of the drain auger of FIG. 3, showing a folding mechanism, according to an exemplary embodiment.

Referring to FIGS. 3-4, various aspects of a drain cleaning tool, shown as a drain auger 110, are shown. Drain auger 110 includes a tip portion 112, a body 114, a cable or coil 115, and a handle 124. Cable 115 extends from handle 124 through the body 114 and tip portion 112 of the drain auger 110. Tip portion 112 is coupled to body 114 at a first end 123. A second end 125 of body 114 opposes first end 123. Tip portion 112 is formed from a flexible material (e.g., rubber, silicone, etc.). The flexible tip portion 112 allows for easier insertion into a fixture like a toilet bowl, while also preventing accidental damage (e.g., chipping, scratching, etc.).

Tip portion 112 is designed to include a long boot 113. Boot 113 includes a boot opening 126. Boot 113 and boot opening 126 are sized to fully receive cable 115 which further helps prevent scratching of the toilet bowl. Many augers include boots that cannot fully receive or surround the end of the cable, leaving a portion of the cable extending outward from the auger in a position that may scratch the toilet bowl during insertion and use of the auger. In a specific embodiment, cable 115 includes an end or bulb portion that can be used to break through or retrieve objects or debris (e.g., hair) causing blockage within a drain or pipes. In other embodiments, cable 115 may not include a bulb portion or may include another attachment tool at the distal end.

Cable 115 includes a flexible portion 116, a rigid portion 118, and an angled portion 122. The end of cable 115 that includes angled portion 122 is coupled to handle 124. The opposing end of cable 115 is extended through an elongated tube or passageway within body 114 and tip portion 112 of drain auger 110. The combination of the flexible portion 116 and rigid portion 118 allow a user to fold drain auger 110 so that it has a reduced length for storage and transportation of the tool. While the flexible portion 116 facilitates the folding of cable 115, the rigid portion 118 ensures the user is able to generate enough force to break through a drain blockage.

To use drain auger 110, a user inserts the tip portion 112 when the cable 115 is fully nested within boot 113 into a plumbing fixture such as a toilet. The user can then turn handle 124 in a clockwise direction while pushing downward (e.g., toward the toilet) to move cable 115 within body 114 and out of tip portion 112 through boot opening 126 so that cable 115 extends into the toilet and connected pipe system where there may be a blockage. Cable 115 can be pulled back and reextended as necessary using handle 124 until the blockage is opened or removed.

Once the blockage is removed, cable 115 can be retracted from the pipe system by pulling handle 124 upward (e.g., away from the toilet). As discussed above, drain auger 110 can be easily cleaned after use. Second end 125 of body 114 of the drain auger 110 is coupled to a funnel 120. Funnel 120 includes an opening or hose opening 134. Hose opening 134 is configured to receive at least a portion of a hose or tubing. A hose can be placed in hose opening 134 of funnel 120 such that when water is turned on any debris (e.g., the drain blockage) or liquid remaining from the drain cleaning process can be removed from drain auger 110. Funnel 120 and hose opening 134 are sized to allow for sealing of the hose to funnel 120 such that the water will be forced through body 114 and tip portion 112 during the cleaning process.

Drain auger 110 further includes one or more retention components, shown as clips 128. Each clip 128 includes a connector 130 extending at least partially around body 114. Each clip 128 further includes a pair of retention arms 132 configured to grasp a portion of the cable 115. When the flexible portion 116 of cable 115 is folded, the rigid portion 118 extends in a generally parallel manner to body 114. When the rigid portion 118 is in this parallel position, the retention arms can grasp and or hold rigid portion 118 and cable 115 close to the body 114 reducing the total length of the drain auger.

In a specific embodiment, a total or extended length of the drain auger is about 6 feet (e.g., 6 feet plus or minus 6 inches). In such an embodiment, a folded length of drain auger 110 is defined as L1 and L1 is about 40 inches (e.g., 40 inches plus or minus 3 inches). As mentioned above, the ability to fold drain auger 110 creates an auger that is 3-4 feet in length when folded for transport and storage that can function as a 6 foot auger when used for drain cleaning.

In contrast to the drain cleaning tools discussed herein, many conventional drain cleaning tools include a handle projecting downward such that a user is holding the drum above their hand and/or wrist. Applicant's handle is designed in a manner allowing the handle to be positioned above the drain cleaning tool during use such that the drum is positioned below the hand and/or wrist of the user. The handle is rotatable allowing for user adjustment and is includes an ergonomic shape. In a specific embodiment, the handle is rotatable 360 degrees such that a user can position and/or move the handle into a position comfortable for use of the drain cleaning tool. In a specific embodiment, the handle shape is curved and facing a tip of the drain cleaning tool. Further, Applicant's handle is located over the center of gravity of the tool and/or or slightly forward of the center of gravity of the drain cleaning tool. Applicant believes the described positioning of the handle relative to the center of gravity of the drain cleaning tool reduces the strain on the user's wrist during use of the drain cleaning tool.

In various embodiments, the drain cleaning tool includes a cable locking assembly. In contrast to drain cleaning tool discussed herein, many conventional drain cleaning tools include a lock at the tip of the tool (i.e., where the cable exits the tool neck). Applicant's cable locking assembly is positioned between the drum and the tip of the tool. Applicant believes the position of the locking assembly for the drain snake tool discussed herein prevents accidental actuation that would release the cable during use.

In a specific embodiment, the drain cleaning tool includes a spinning handle on the back of the drum to allow for coiling the cable within the drum after use of the tool. The spinning handle is foldable (i.e., flips down) such that draining cleaning tool is more compact for storage. Specifically, when the spinning handle is in the storage position, the spinning handle forms a flat surface such that the drain cleaning tool can be stored in a standing up position.

Figure 5:
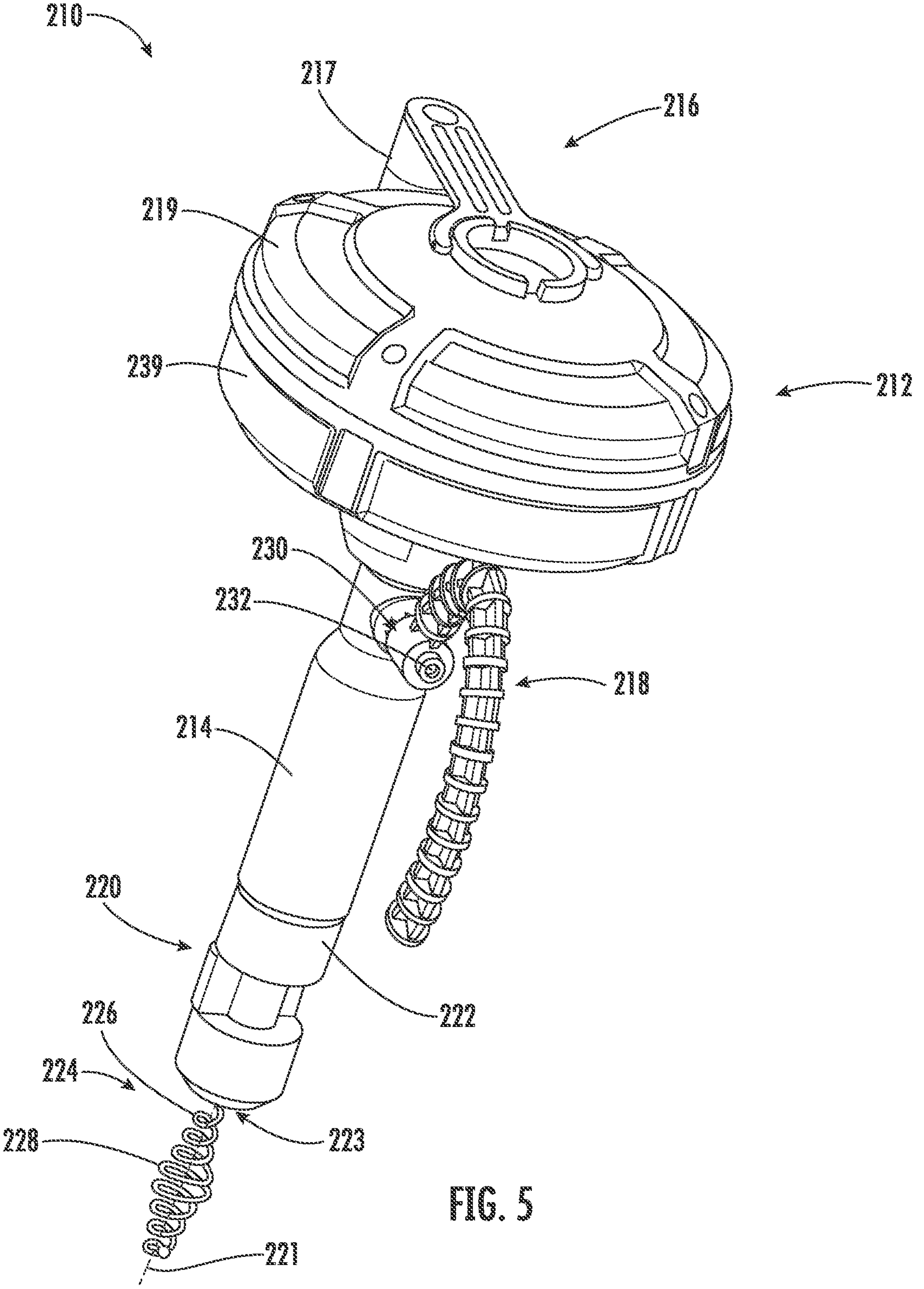
FIG. 5 is a perspective view of a drain snake tool, according to an exemplary embodiment.
Figure 6:
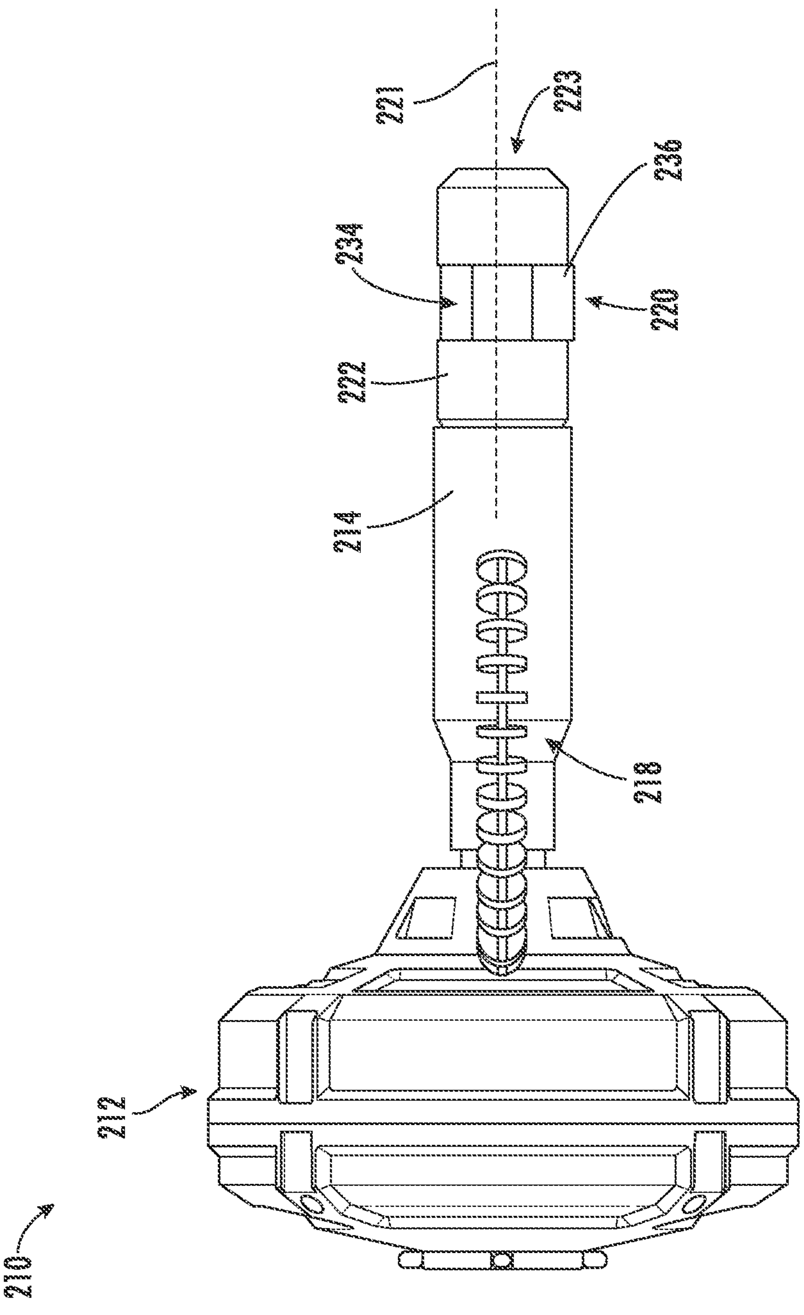
FIG. 6 is a side view of the drain snake tool of FIG. 5, according to an exemplary embodiment.

Referring to FIGS. 5-6, various aspects of a drain cleaning tool, shown as a drain snake 210, are shown. Drain snake 210 includes a drum 212, a tube and/or neck 214, a spinning handle 216, a support handle 218, a cable or coil 224, and a cable lock assembly 220. In a specific embodiment, tube and/or neck 214 acts a shield to protect drum 212 and/or fixtures (e.g., sink, bathtub, etc.) from damage (e.g., scratching, chipping, etc.) that could be caused by the spinning drum 212. Drum 212 includes a first or lower portion 239 coupled to a second or upper portion 219. The drum 212 is positioned at least partially within neck 214 that surrounds an elongated tube or passageway 240 (i.e., feed tube for the cable 224, see e.g., FIG. 8) that extends into and/or through drum 212. In a specific embodiment, elongated tube 240 is integral with drum 212. In other words, elongated tube 240 and drum 212 are a single continuous, and/or integral part such that elongated tube 240 and drum 212 are permanently joined and/or a unitary part. In various other embodiments, elongated tube 240 and drum 212 are separate components that are joined or coupled (e.g., by fasteners, adhesive, etc.). The drum 212 is configured to rotate within the neck 214 causing rotation of cable 224. Drain snake 210 further includes a tip or end portion 222 at a distal end of drain snake 210 (i.e., end away from drum 212). End portion 222 includes the tip of drain snake 210 with an exit opening or bore 223.

Figure 7:
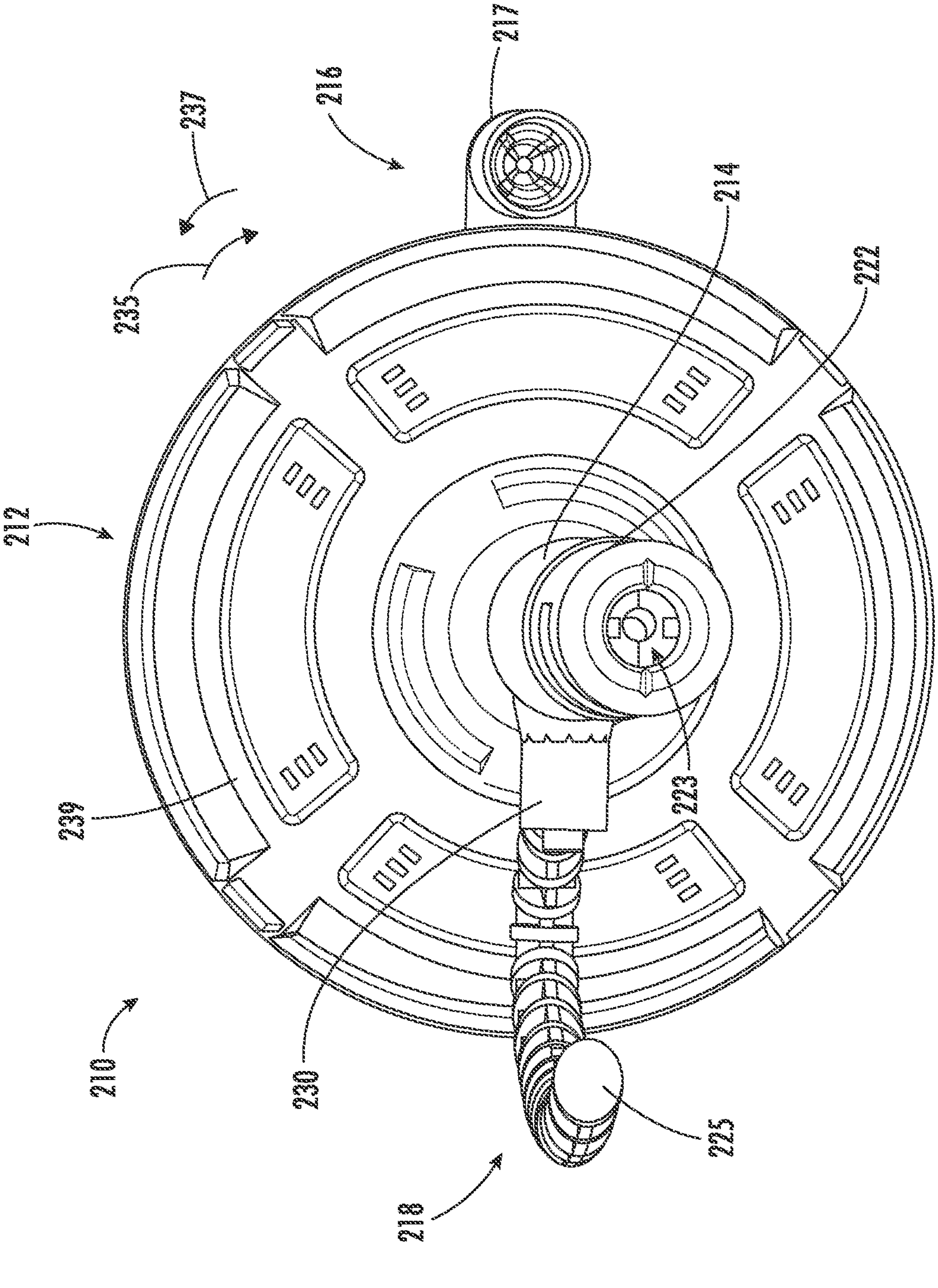
FIG. 7 is a bottom perspective view of the drain snake tool of FIG. 5, according to an exemplary embodiment.

Referring to FIG. 7, drum 212 is rotatable in a clockwise direction, shown by arrow 235 and a counterclockwise direction, shown by arrow 237. As drum 212 rotates, cable 224 rotates, allowing cable 224 to move around curves within the drain and also to clean/unblock the drain. Cable 224 is formed from a flexible material and stored within drum 212 (e.g., wound around a reel) when drain snake 210 is not in use. Cable 224 extends through elongated tube 240 and exits drain snake 210 and neck 214 through the exit opening 223 at an end distal from drum 212 so that cable 224 can extend into a drain. In a specific embodiment, cable 224 includes a narrower cable portion 226 and an end or bulb portion 228 (see e.g., FIG. 5) that can be used to break through or retrieve objects or debris (e.g., hair) causing blockage within a drain or pipes. In other embodiments, cable 224 may not include a bulb portion or include another attachment tool at the distal end. In specific embodiments, cable 224 has a length between 15 to 35 feet, and specifically about 25 feet (e.g., 25 feet plus or minus 1 foot).

Referring to FIGS. 5-6, cable 224 is fed through drain snake 210 and specifically through drum 212, neck 214 and/or end portion 222 along a longitudinal axis 221 of drain snake 210. Cable 224 is extended out of exit opening 223 in a first direction, along longitudinal axis 221 into the drain by moving linearly. Similarly, cable 224 can be retracted into exit opening 223 and elongated tube 240 when moved linearly in a second direction, opposite the first direction and along the longitudinal axis 221. Spinning handle 216 is coupled to a rear side of upper portion 219 of drum 212. In other words, spinning handle 216 is coupled to a rear surface of drum 212. Spinning handle 216 is rotatable around the longitudinal axis 221 to recoil cable 224 into the drum 212 after use of drain snake 210. Spinning handle 216 includes a grip portion 217 and is foldable (i.e., flips down) such that drain snake 210 is more compact for storage.

As previously mentioned, Applicant's support handle 218 is designed to be positioned above the drain snake 210 during use such that the drum 212 is positioned below the hand and/or wrist of the user (see e.g., FIG. 6). The support handle 218 is rotatable allowing for user adjustment and is shaped to have an ergonomic design. Applicant believes these aspects of the support handle design reduce strain on the user's hand and/or wrist and increase comfort during use of drain snake 210.

Referring to FIG. 5, support handle 218 is coupled to neck 214 that acts as a lower support handle and is positioned between the drum 212 and a tip of the drain snake 210. Specifically, support handle 218 includes a connection portion 230 coupled to neck 214 by a fastener, shown as bolt 232. As will be discussed in greater detail below, support handle 218 is adjustable. In another specific embodiment, support handle is rotatable. Support handle 218 includes a shape that is curved that extends towards the drum 212 and then curves toward the distal end. In a specific embodiment support handle 218 is generally facing the tip of drain snake 210 and exit opening 223 (see e.g., FIG. 7). In such an embodiment, an end surface 225 of support handle 218 generally faces the same direction (i.e., away from drum 212) as the distal end of the drain snake 210.

Further, support handle 218 is located over the center of gravity of drain snake 210 and/or or slightly forward of the center of gravity of the drain snake 210. Applicant believes the described positioning of the handle relative to the center of gravity tool reduces the strain on the user's wrist during use of drain snake 210. The center of gravity of drum 212 is behind the center of gravity of drain snake 210 with or without cable 224 positioned in drum 212.

Figure 8:
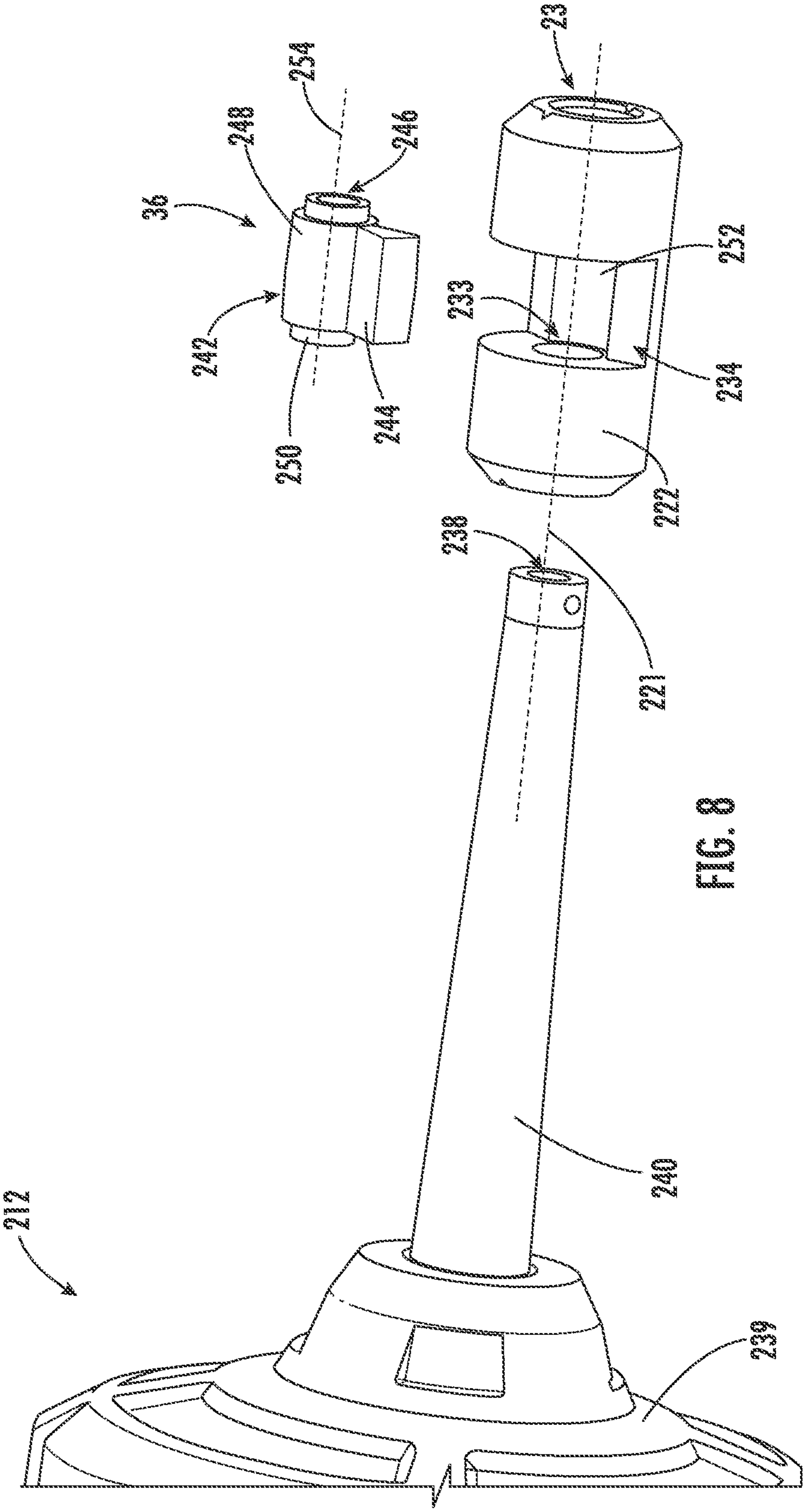
FIG. 8 is a partially exploded view of the drain snake tool of FIG. 5 with a portion of the neck of the tool removed, according an exemplary embodiment.

Referring to FIG. 8, a partially exploded view of drain snake 210 with a portion of neck 214 removed is shown according to an exemplary embodiment. Elongated tube 240 extends away from lower portion 239 of drum 212 along longitudinal axis 221. Elongated tube 240 includes an opening 238 at an end distal from drum 212. Opening 238 of elongated tube 240 is aligned with exit opening 223 of end portion 222 (i.e., aligned along longitudinal axis 221).

Actuator 236 includes a body 242 and a lever portion 244 extending away from body 242. Body 242 includes a channel or through bore 246 extending through body 242 of actuator 236 along a longitudinal actuator axis 254. When cable locking assembly 220 is assembled, longitudinal actuator axis 254 extends in the same direction as longitudinal axis 221. Each opposing end of body 242 includes a projection 250 extending away from body 242 along longitudinal actuator axis 254. Projection 250 is configured to be received and/or connected to end portion 222 when cable lock assembly 220 is assembled. In a specific embodiment, projection 250 has a cylindrical shape. In a specific embodiment, body 242 has a cylindrical shape. Body 242 further includes an outer surface 248.

End portion 222 includes a recess 234 (see e.g., FIG. 6) sized and/or configured to receive actuator 236 of cable lock assembly 220. Recess 234 includes a curved surface 252 configured to engage and/or interface against body 242 and specifically outer surface 248 of actuator 236. End portion 222 further includes an actuator channel 233 extending through end portion 222 along longitudinal axis 221 on opposing sides of recess 234. Actuator channel 233 receives projections 250 of actuator 236 such that actuator 236 remains coupled to end portion 222 during the rotation of actuator 236.

Figure 9:
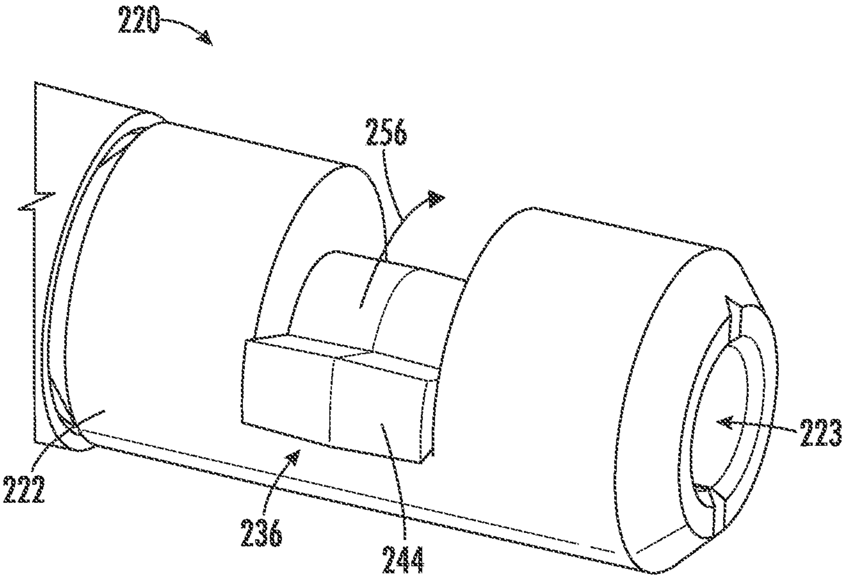
FIG. 9 is a detailed perspective view of an actuator of a locking assembly of the drain snake tool of FIG. 5 in a first, locked position, according an exemplary embodiment.
Figure 10:
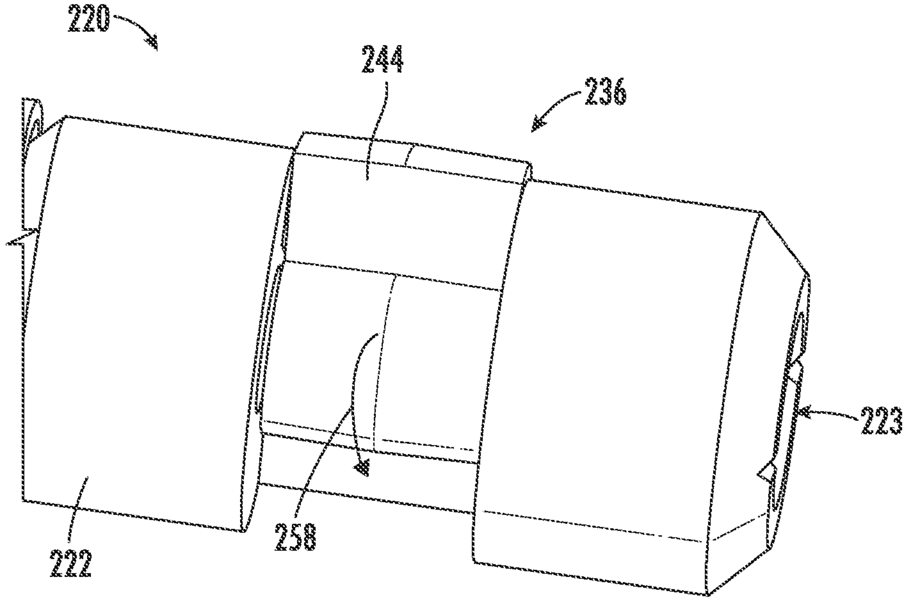
FIG. 10 is a detailed perspective view of the actuator of the locking assembly of the drain snake tool of FIG. 5 in a second, unlocked position, according an exemplary embodiment.

Referring to FIGS. 9-10 detailed perspective views of the cable lock assembly 220 are shown according to an exemplary embodiment. FIG. 9 shows actuator 236 in a first, locked position while FIG. 10 shows actuator 236 in a second, unlocked position. When actuator 236 is in the locked position, through bore 246 is offset (i.e., not aligned) from elongated tube 240 and/or opening 238 of drum 212 and actuator channel 233 of end portion 222. The offset creates a reduction in a dimension of the through bore 246 which in turn presses and/or pushes the cable 224 between a wall of the actuator 236 and a wall of the elongated tube 240 (i.e., acts like an eccentric locking collar), locking cable 224 in place such that a user can manipulate the cable 224 when the cable is inserted into a drain because cable 224 is prevented from moving rotationally and/or axially. In a specific embodiment the offset creates a reduction in a diameter of through bore 246. Once a user of drain snake 210 has finished manipulating cable 224, the user can operate lever portion 244 to move actuator 236 in the unlocking direction, shown by arrow 256. Actuator 236 rotates about longitudinal axis 221 and longitudinal actuator axis 254 when being moved between the locked and unlocked positions. In a specific embodiment, actuator 236 is rotatable about 180 degrees (i.e., 180 degrees plus or minus 10 degrees).

When actuator 236 is in the second, unlocked position through bore 246 is in line with elongated tube 240 and/or opening 238 of drum 212 and actuator channel 233 of end portion 222. In such a position, cable 224 is free to move rotationally and/or axially (i.e., cable 224 is moveable with respect to end portion 222). When a user wants to manipulate cable 224, the user can operate lever portion 244 to move actuator 236 in the locking direction, shown by arrow 258.

Figure 11:
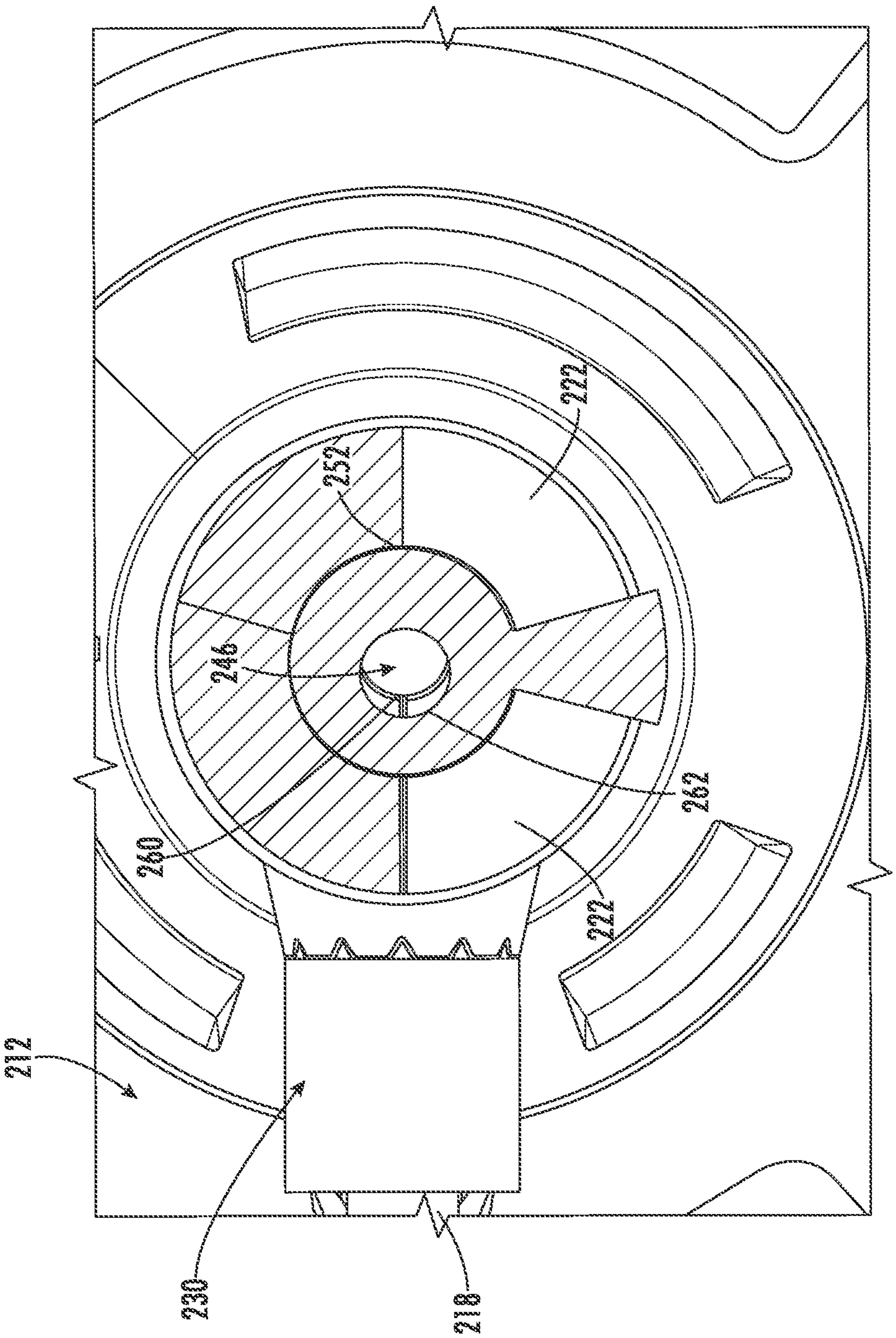
FIG. 11 is a cross-sectional view of the actuator of the locking assembly of the drain snake tool of FIG. 9 in the first, locked position, according an exemplary embodiment.
Figure 12:
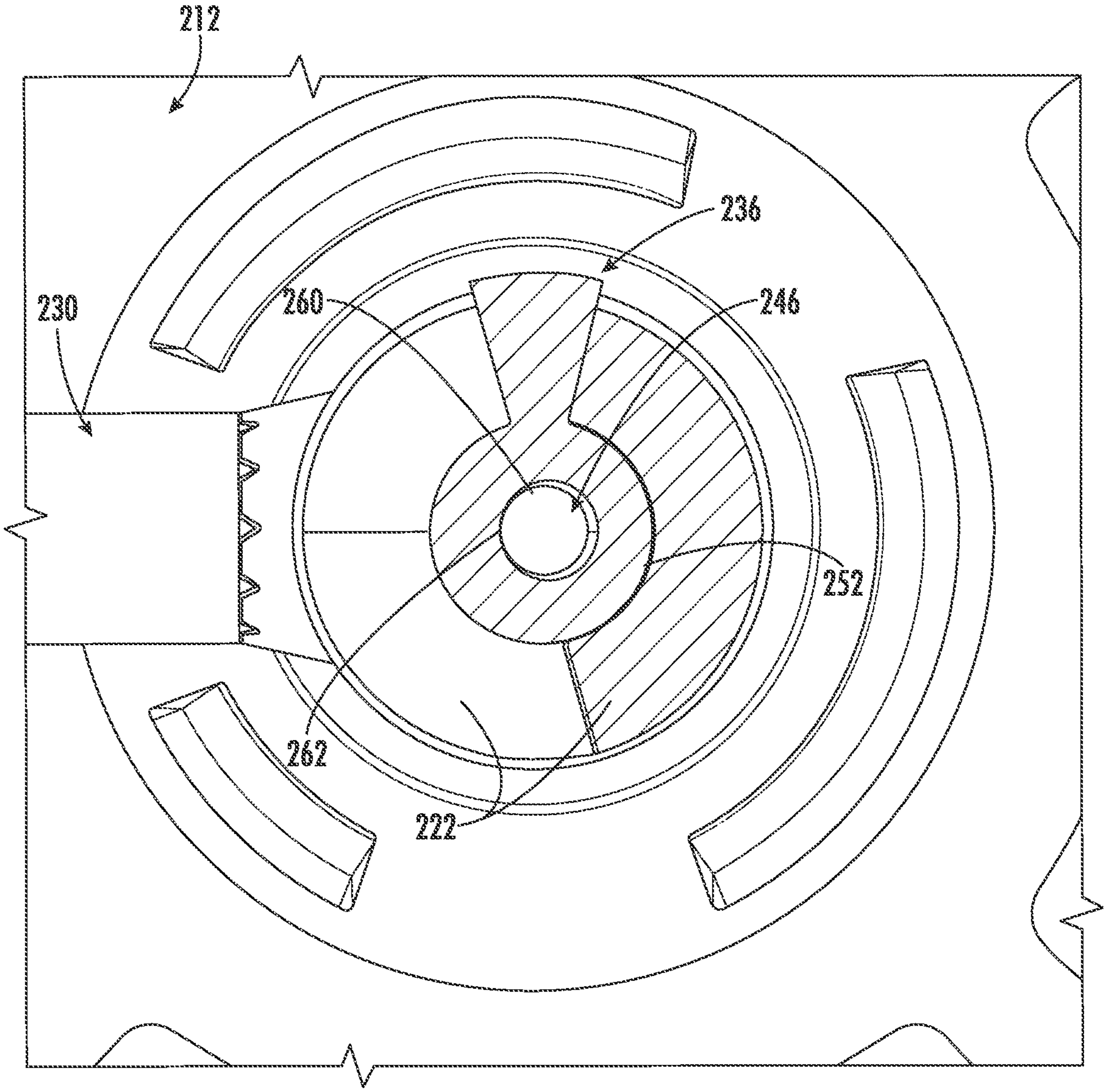
FIG. 12 is a cross-sectional view of the actuator of the locking assembly of the drain snake tool of FIG. 10 in the second, unlocked position, according an exemplary embodiment.

Referring to FIGS. 11-12, cross-sectional views of the cable lock assembly 220 are shown according to an exemplary embodiment. FIG. 11 shows actuator 236 in the first, locked position while FIG. 12 shows actuator 236 in the second, unlocked position. As shown in FIG. 11, in the locked position, an inner surface 260 of actuator channel 233 extends further inward than an inner surface 262 of through bore 246 of actuator 236 creating the previously described offset. The offset (i.e., difference in inward extension) between inner surface 260 of actuator channel 233 and inner surface 262 of through bore 246 presses cable 224 against the wall of elongated tube 240. As shown in FIG. 12, in the unlocked position, inner surface 262 of through bore 246 of actuator 236 extends around inner surface 260 of actuator channel 233 such that through bore 246 is aligned with actuator channel 233. The alignment of through bore 246 prevents cable 224 from being pressed against the wall of elongated tube 240. In other words, when actuator 236 is in the unlocked position, both the actuator channel 233 and the pair of locking channels 272 are aligned with elongated tube 240.

Figure 13:
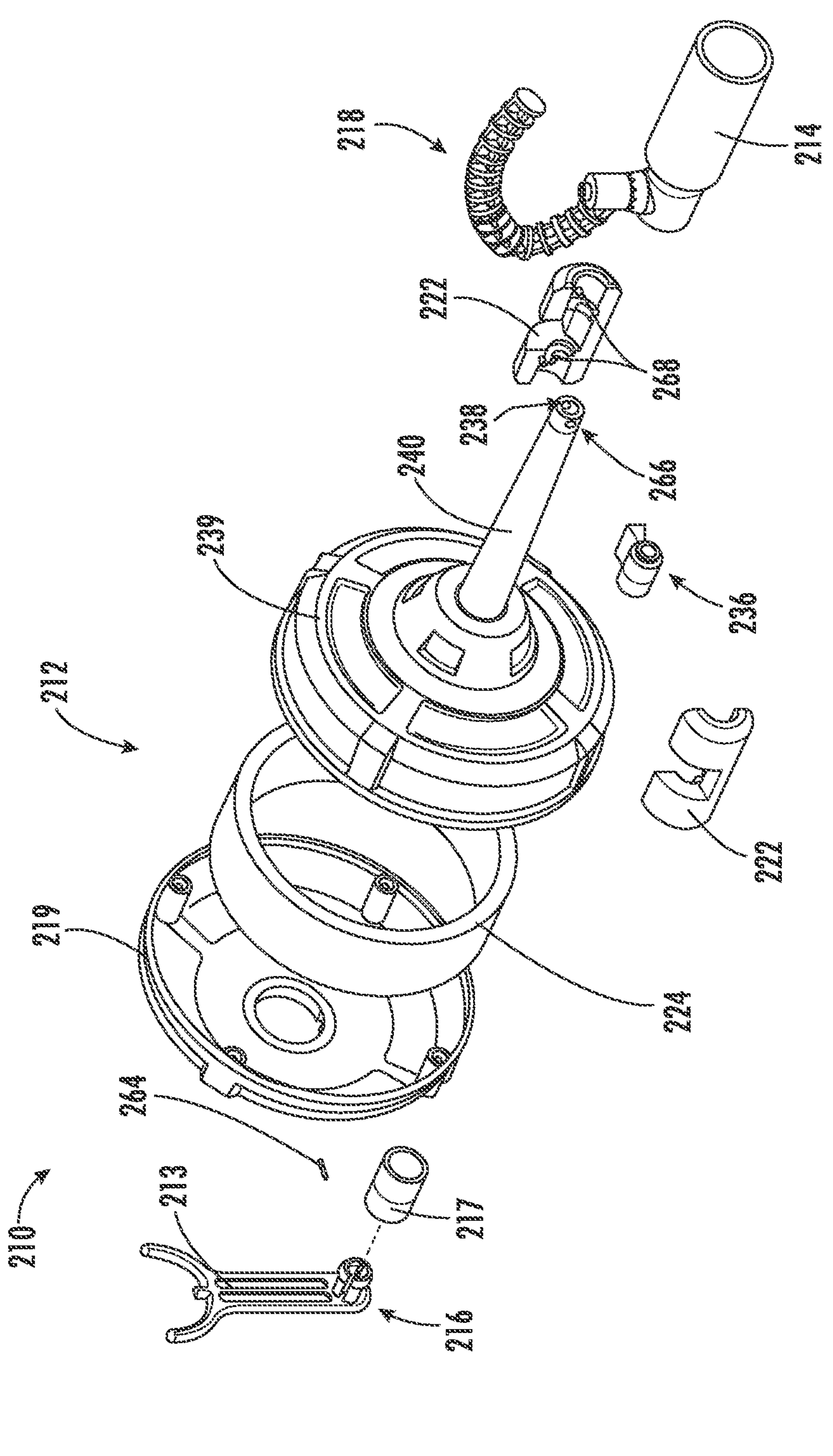
FIG. 13 is an exploded view of the drain snake tool of FIG. 5, according to an exemplary embodiment.

Referring to FIG. 13, an exploded view of drain snake 210 is shown according to an exemplary embodiment. Further details of spinning handle 216 are shown. Grip portion 217 attaches to a crank handle 213. In a specific embodiment, grip portion 217 is coupled to crank handle 213 by snap fit. Grip portion 217 is freely rotatable around the post portion of crank handle 213. Crank handle 213 is coupled to upper portion 219 of drum 212 by at least one pin 264. In a specific embodiment, two pins 264 are used to attach spinning handle 216 and specifically crank handle 213 to upper portion 219 of drum 212. Pins 264 align with holes or bores positioned in upper portion 219 and crank handle 213 keeping the holes in a coaxial position. The alignment allows crank handle 213 to rotate. In a specific embodiment, crank handle 213 is rotatable about 180 degrees (e.g., 180 degrees plus or minus 10 degrees).

Figure 18:
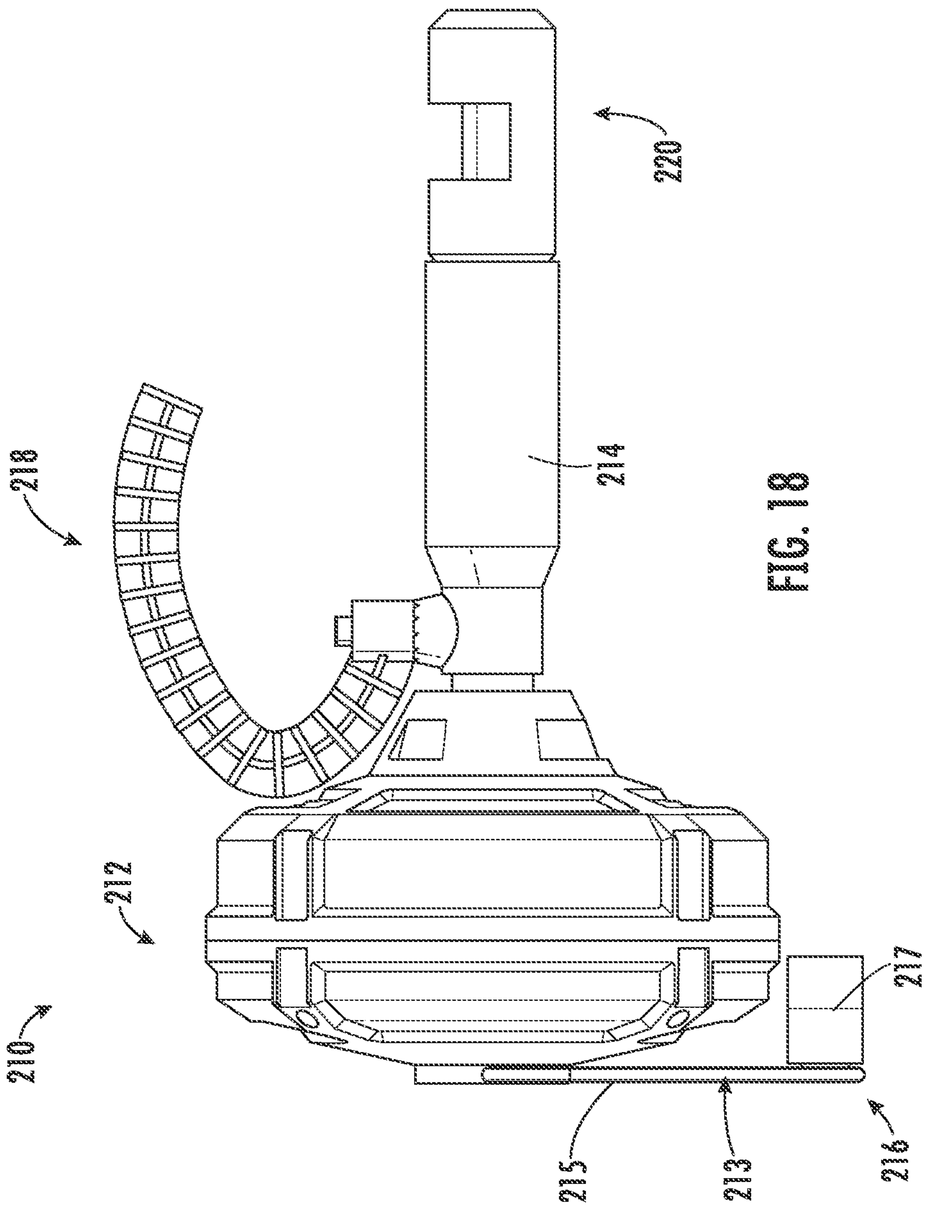
FIG. 18 is a side view of the drain snake tool of FIG. 5 with the spinning handle in a first, storage position, according to an exemplary embodiment.
Figure 19:
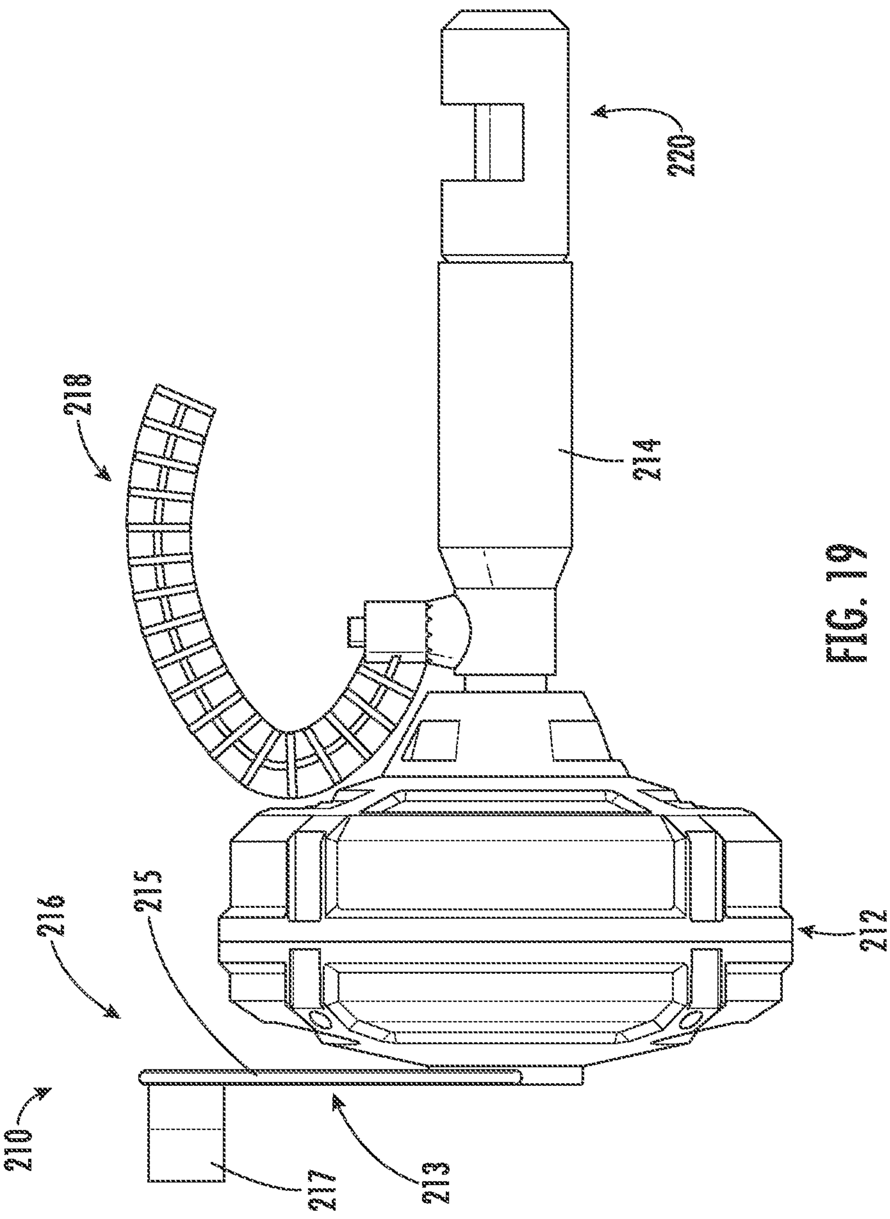
FIG. 19 is a side view of the drain snake tool of FIG. 5 with the spinning handle in a second, crank position, according to an exemplary embodiment.

Referring to FIGS. 18-19 side views of the drain snake 210 tool with the spinning handle 216 in a first, storage position (see e.g., FIG. 18) and a second, crank position (see e.g., FIG. 19), according to an exemplary embodiment. In the crank position shown in FIG. 19, grip portion 217 of spinning handle 216 is exposed and/or available for a user to grasp. The user can grasp the grip portion 217 of spinning handle 216 as the drum 212 is rotated. Once a user is finished using drain snake 210, spinning handle 216 can be rotated 180 degrees such that grip portion 217 is not exposed and/or available for a user to grasp (see e.g., FIG. 18). In other words, spinning handle 216 includes a grip portion 217 and is moveable between a crank position where grip portion 217 extends away from drum 212 for a user to grasp and a storage position where grip portion 217 extends toward drum 212 such that the spinning handle 216 forms a flat and/or planar surface.

As shown in FIG. 18, in the storage position, crank handle 213 and specifically an outer surface 215 of crank handle 213 forms a support (e.g., flat or planar surface) allowing drain snake 210 to be stored with the spinning handle outer surface 215 located on a support surface (ground, table, etc.) in a standing up (e.g., vertical position or with tool in longitudinal orientation). Applicant believes the rotatable spinning handle 216 and stand up storage not only makes it easier to store drain snake 210 (i.e., takes up less space), but this storage position also allows any excess moisture and/or liquid to drain from drum 212, keeping drain snake 210 in working order and increasing the lifespan of the tool.

Referring to FIG. 13, further details of drum 212 and elongated tube 240 are shown. Cable 224 is shown schematically as a ring positioned between upper portion 219 and lower portion 239 of drum 212. As previously discussed, opening 238 is positioned at an end of elongated tube 240 distal from drum 212. Also positioned at the distal end of elongated tube 240 are cross holes 266. Cross holes 266 are positioned in a generally perpendicular orientation (i.e., 90 degrees plus or minus 10 degrees) from opening 238. Cross holes 266 allow for coupling and/or attachment of elongated tube 240 to end portion 222 and specifically to alignment lugs 268 of end portion 222.

Figure 14:
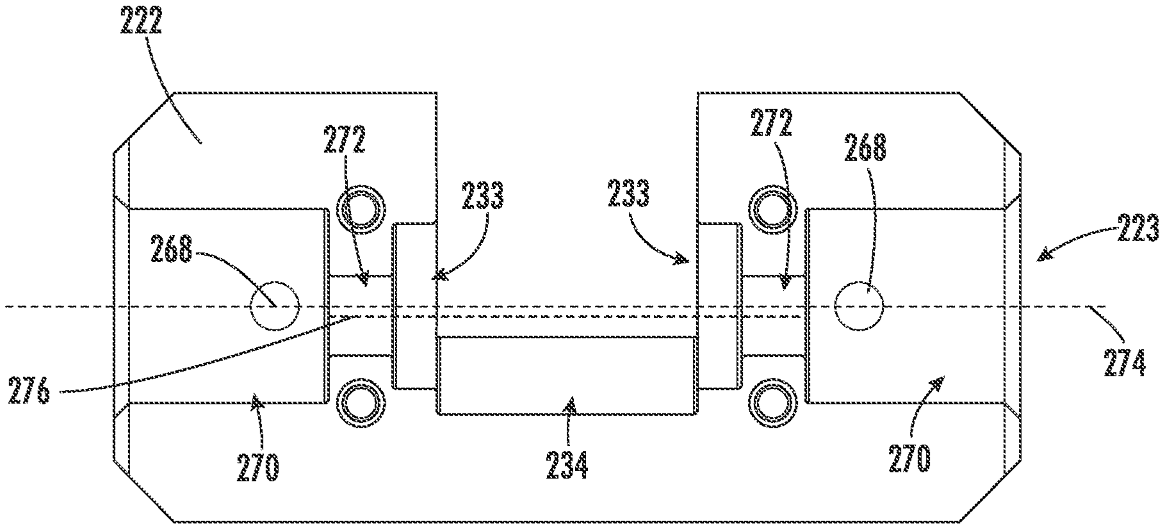
FIG. 14 is detailed view of an end portion of the drain snake tool of FIG. 5, according to an exemplary embodiment.
Figure 15:
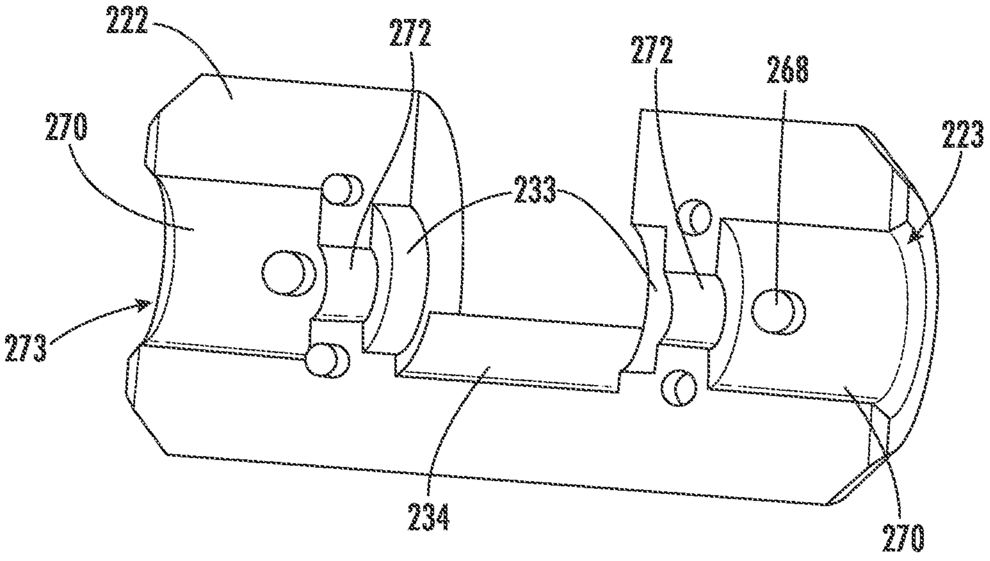
FIG. 15 is a detailed view of half of the end portion of the drain snake tool of FIG. 5, according to an exemplary embodiment.

Referring to FIGS. 14-15, detailed views of end portion 222 are shown, according to an exemplary embodiment. When drain snake 210 is assembled, a proximal channel 270 of end portion 222 is aligned with opening 238. End portion 222 further includes a distal channel 270 aligned with opening 238. When alignment lugs 268 which are positioned within proximal channel 270 and/or distal channel 270 are engaged with cross holes 266, rotation and/or axial movement of end portion 222 is prevented.

In a specific embodiment, end portion 222 includes two components. Applicant has designed each component and/or half of end portion 222 to be used twice in drain snake 210 to reduce cost (i.e., limit tooling) and improve ease of assembly. Accordingly, the features on each component are present on both the left and right side of the part, as such each feature will be discussed once. End portion 222 includes locking channels 272 which are part of cable locking assembly 220 and offset from the longitudinal axis 221. A locking channel 272 is positioned between each actuator channel 233 and either the proximal or distal channel 270.

A longitudinal axis, shown as central axis 274 of end portion 222 extends between exit opening 223 and an opposing opening 273 positioned adjacent to and/or near proximal channel 270. Locking channels 272 extend along central axis 274 of end portion 222 and are positioned on opposing sides of actuator 236. Locking channels 272 are offset below central axis 274 (i.e., not centered on central axis 274). Locking channels 272 are instead centered around a locking axis 276. In other words, locking channels 272 are centered around locking axis 276, locking axis 276 extends in a parallel orientation and is offset a distance from central axis 274 of end portion 222 with the offset of the pair of locking channels 272 creating an interference point such that the cable 224 is pressed against the inner surface of the elongated tube 240 to lock the cable 224 in place (i.e., prevent rotational and axial movement of the cable 224). Locking axis 276 extends between exit opening 223 and opposing opening 273 and is parallel to central axis 274 of end portion 222. In other words, when locking channels 272 are offset from central axis 274 the locking axis 276 is parallel and not collinear to central axis 274. The offset of locking channels 272 creates an interference or pinch point that presses cable 224 against the wall of elongated tube 240 holding and/or locking cable 224 in place. In a specific embodiment, the offset or difference between central axis 274 and locking axis 276 is between 0.65 mm and 1.05 mm, specifically between 0.75 mm and 0.95 mm, and more specifically between 0.80 mm and 0.90 mm. In such an embodiment, the offset of locking channels 272 is about 0.85 mm (e.g., 0.85 mm plus or minus 0.02 mm).

As previously discussed, actuator 236 also includes an offset. Through bore 246 and longitudinal actuator axis 254 are offset below central axis 274 with longitudinal actuator axis 254 parallel to central axis 274. In other words, longitudinal actuator axis 254 (shown as a central axis) and longitudinal axis 221 of drain snake 210 and/or central axis 274 of end portion 222 are collinear when actuator 236 is in the unlocked position. When actuator 236 is rotated into the locked position, the position of actuator 236 shifts such that actuator axis 254 is parallel, but not collinear to longitudinal axis 221 of drain snake 210 and/or central axis 274 of end portion 222.

In a specific embodiment, the offset or difference between central axis 274 and longitudinal actuator axis 254 is between 0.65 mm and 1.05 mm, specifically between 0.75 mm and 0.95 mm, and more specifically between 0.80 mm and 0.90 mm. In such an embodiment, the offset of bore 246 of actuator 236 is about 0.85 mm (e.g., 0.85 mm plus or minus 0.02 mm).

In a specific embodiment, through bore 246 of actuator 236 and locking channels 272 are offset by the same amount in the same direction (i.e., below the central axis). In other words, in such an embodiment, a distance that actuator channel 233 is offset from longitudinal axis 221 of drain snake 210 is the same as a distance locking channels 272 are offset and the offset of actuator channel 233 is in a first direction relative to the central axis 274 (i.e., longitudinal axis of tip portion 222) and the offset of locking channels 272 is in the first direction relative to central axis 274.

When the offset of the actuator 236 and locking channels 272 are offset in the same direction by the same amount they will be perfectly aligned in one orientation which is the unlocked position. When actuator 236 is rotated 180 degrees the offsets will be rotated 180 degrees such that the through bore 246 and locking channels 272 will be offset double the distance from the central axis 274. In other words, a total distance offset is equal to the distance actuator channel 233 is offset plus the distance the pair of locking channels 272 are offset. In a specific embodiment, the offset of the locked position is between 1.3 mm and 2.1 mm, specifically between 1.5 mm and 1.9 mm, and more specifically between 1.6 mm and 1.8 mm. In such an embodiment, the offset of the cable locking assembly 220 is about 1.7 mm (e.g., 1.7 mm plus or minus 0.1 mm).

Applicant has found when the cable 224 has a 6.35 mm (¼ inch) diameter, the total offset or interference of cable locking assembly 220 should be about 1.7 mm (e.g., 1.7 mm plus or minus 0.1 mm). If the offset is much less, cable 224 is flexible enough to be pulled through the offset. If the offset is much more, cable 224 will be too hard to deform and will break end portion 222 and/or actuator 236 or it will be too difficult (i.e., too much resistance) to turn actuator 236 the full 180 degrees. A similar combination of offsets could be used with a cable with a diameter different than 6.35 mm.

Figure 16:
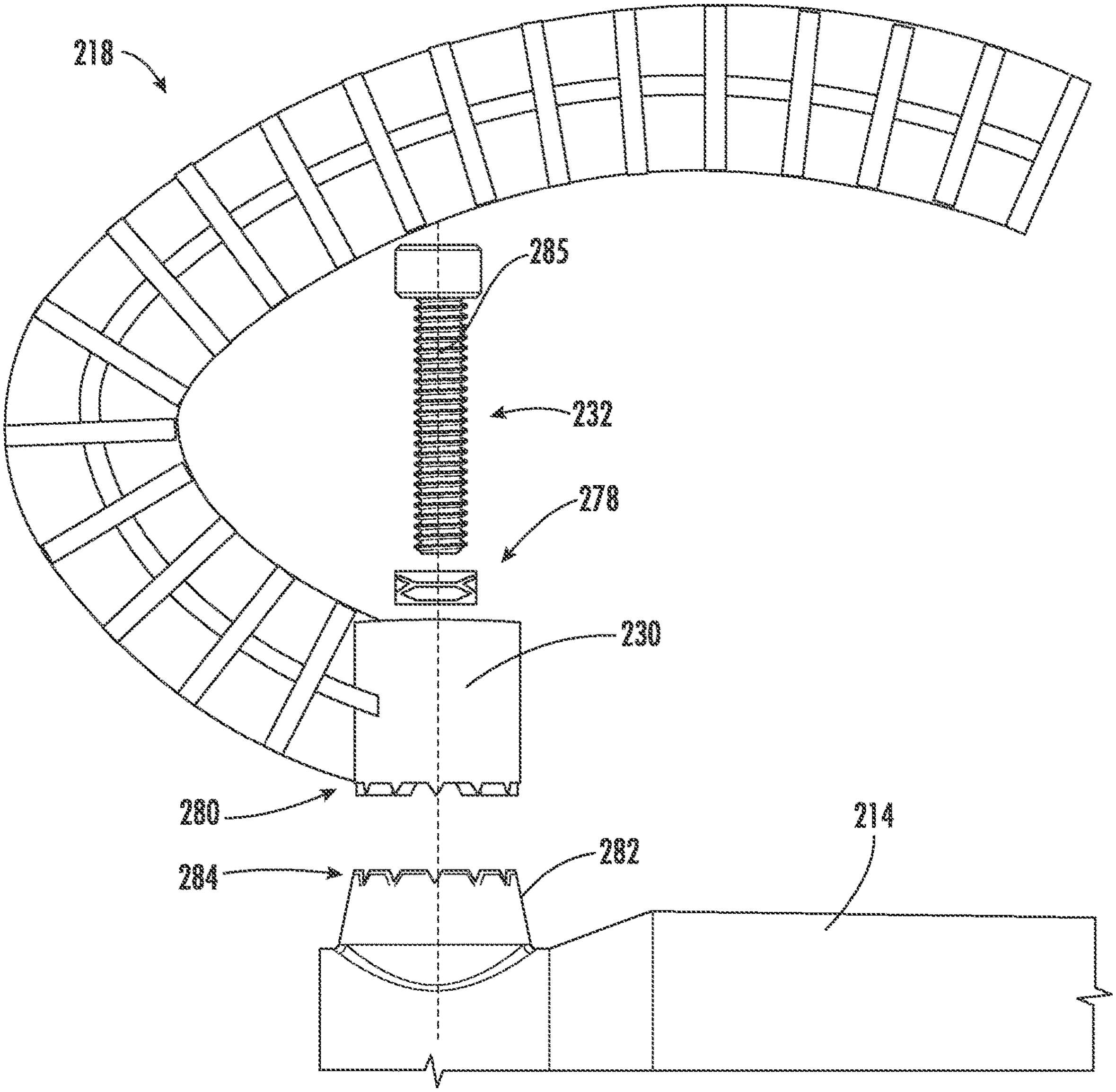
FIG. 16 is an exploded side view of a support handle of the drain snake tool of FIG. 5, according to an exemplary embodiment.

Referring to FIG. 16, an exploded side view of support handle 218 of the drain snake 210 is shown, according to an exemplary embodiment. Support handle 218 includes the connection portion 230 includes a counterbore configured to receive the fastener, shown as bolt 232 and a spring, shown as wave spring 278. Neck 214 includes a connection portion 282 configured to engage connection portion 230. Connection portion 230 of support handle 218 further includes mating teeth 280 and connection portion 282 of neck 214 includes mating teeth 284 configured to engage with mating teeth 280. The mating teeth 280, 284 allow support handle 218 to rotate 360 degrees about a bolt axis 285 that extends along the longitudinal axis of bolt 232. In a specific embodiment, support handle 218 is rotatable in 30 degree increments such that a user can position and/or move support handle 218 into a position comfortable for use of drain snake 210. In other words, adjustable support handle 218 is positioned between the drum 212 and end portion 222 with the support handle 218 configured to allow for 360-degree rotation about an axis of rotation (i.e., bolt axis 285) extending in a generally perpendicular direction to longitudinal axis 221 of drain snake 210.

When a user wants to adjust support handle 218, support handle is pulled in an upward direction (i.e., vertical, or longitudinal direction of bolt 232) or in a direction transverse and/or generally perpendicular (e.g., 90 degrees plus or minus 10 degrees) from the longitudinal axis 221 of drain snake 210 compressing wave spring 278 creating a space and/or clearance between the mating teeth 280, 284. Once support handle 218 has been lifted, a user can rotate support handle 218 into the desired position and then release or let the support handle 218 down. When the support handle 218 is released, the wave spring 278 is no longer compressed and instead locks and/or holds the support handle 218 in the new position.

Figure 17:
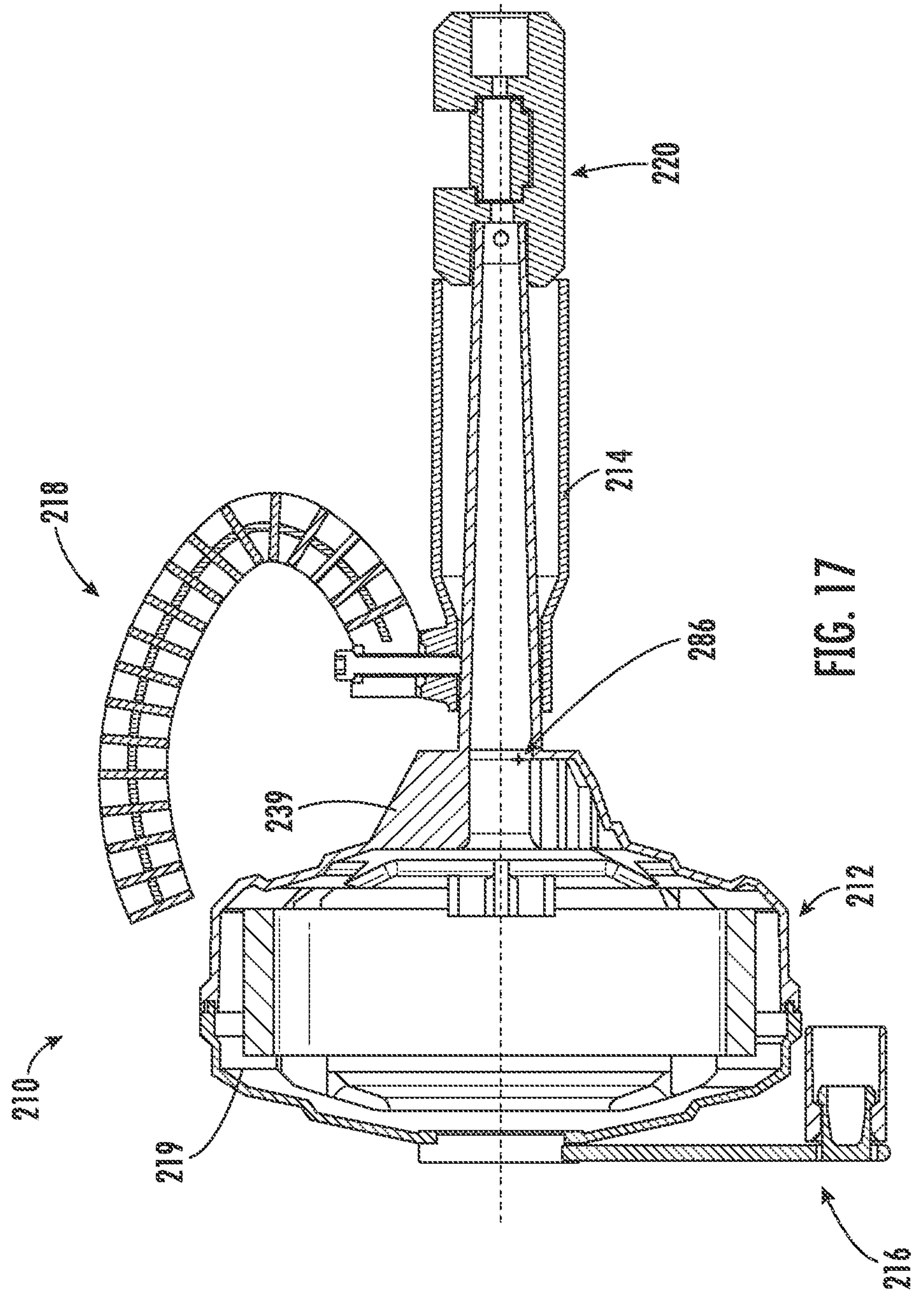
FIG. 17 is a cross-sectional view of the drain snake tool of FIG. 5, according to an exemplary embodiment.

Referring to FIG. 17, a cross-sectional view of the drain snake 210 is shown according to an exemplary embodiment. Support handle 218 is located over the center of gravity 286 of drain snake 210 and/or or slightly forward of the center of gravity 286 of the drain snake 210. In a specific embodiment, the center of gravity 286 is positioned within lower portion 239 of drum 212 or between upper portion 219 and neck 214. The center of gravity 286 is specifically positioned within a proximal end of elongated tube 240 that extends into lower portion 239 of drum 212.

In contrast to the various drain augers discussed herein, many augers have an extended body or rigid portion that may make maneuvering or carrying the drain auger without causing damage difficult (e.g., scratch walls, bump objects etc.). Applicant believes the drain auger including multiple tubes connected by a folding mechanism with a flexible or foldable portion allows for easier transport and storage. For example, an auger with the discussed folding mechanism may allow for a functionally 6 foot auger to be folded and transported and/or stored with a length of less than 6 feet. Additionally, when in the folded position, the open end containing the handle and the opposing open end with the boot both are oriented such that they are facing upwards (i.e., along longitudinal axis of auger and/or angled so foldable portion is closer to the ground). The folded orientation described herein allows for the auger to maintain and/or hold any liquid or debris during transport (i.e., out of a house) within a middle portion, such as a tube, before being rinsed (i.e., with a garden hose, etc.).

Figure 20:
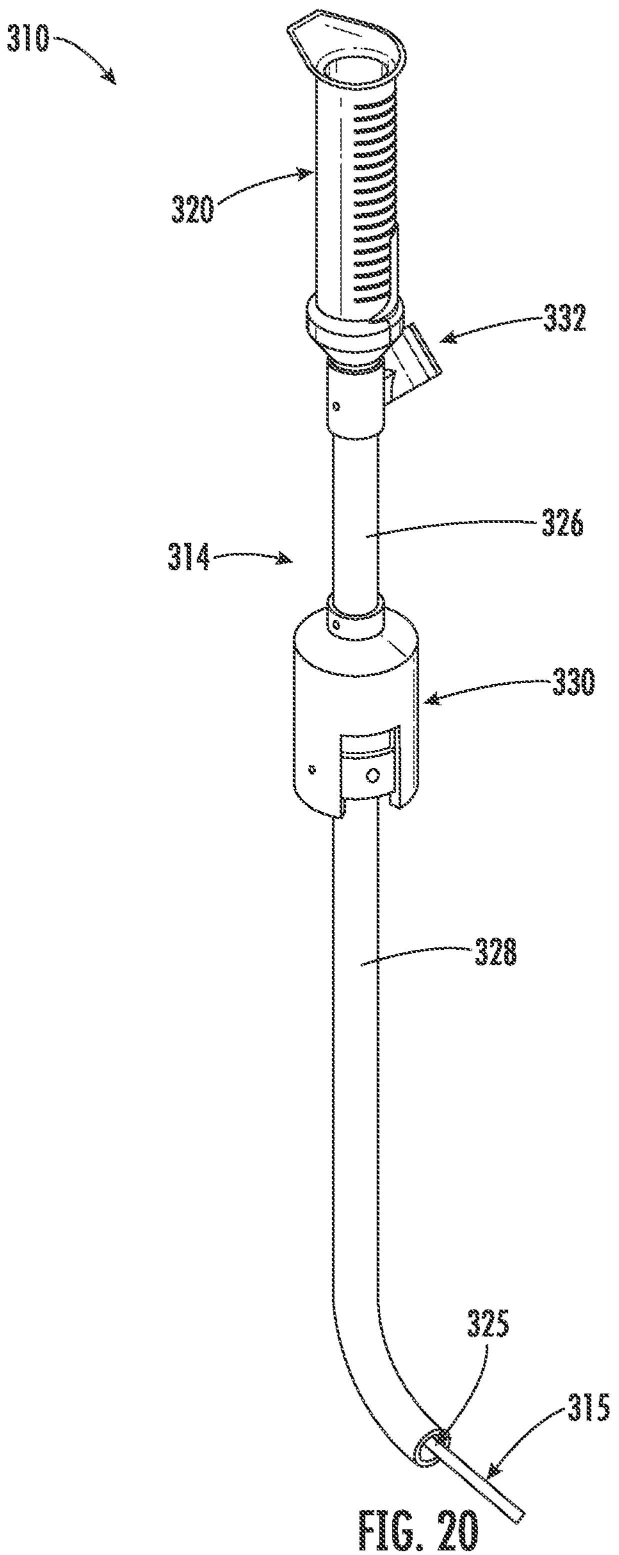
FIG. 20 is a perspective view of a drain auger, according to another exemplary embodiment.
Figure 21:
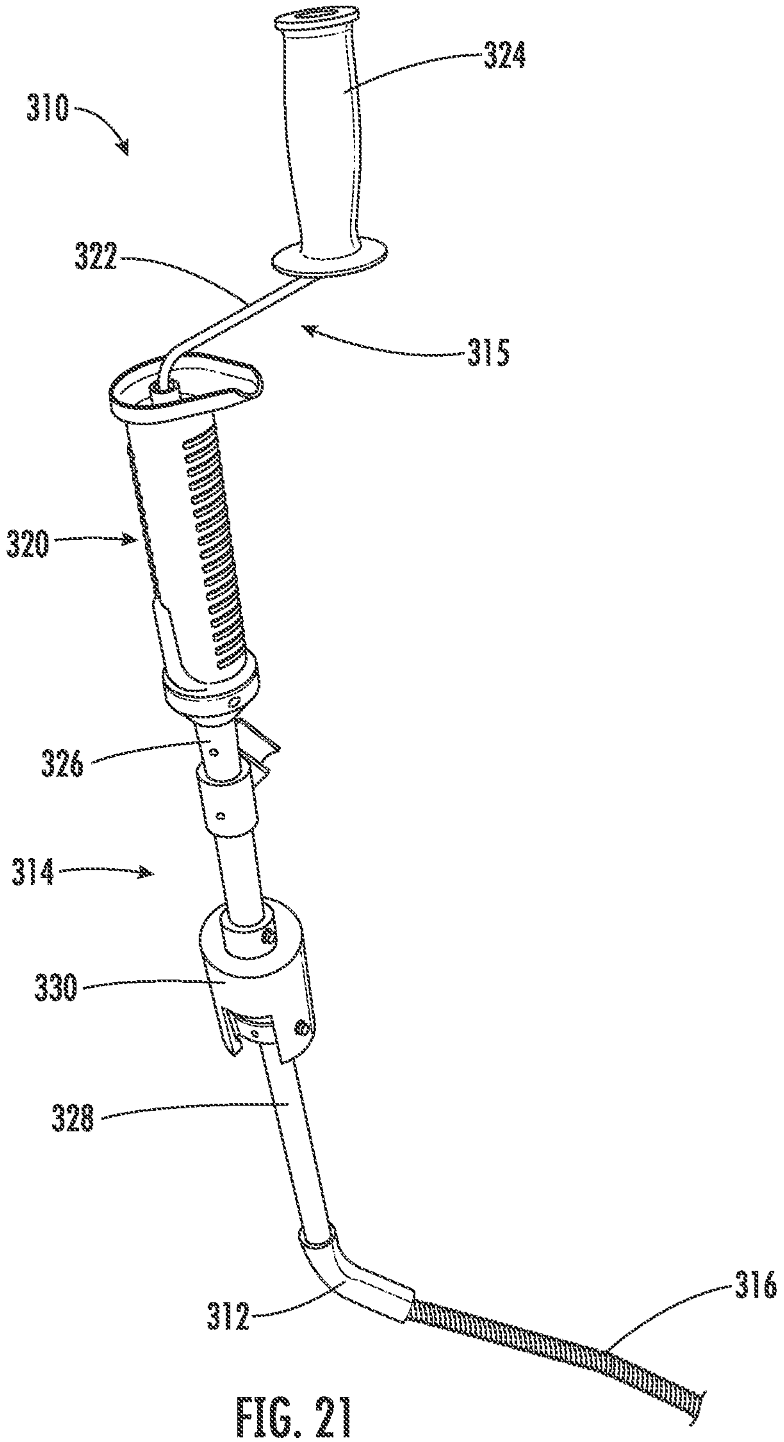
FIG. 21 is a perspective view of the drain auger of FIG. 20, according to an exemplary embodiment.

Referring to FIGS. 20-21, various aspects of a drain cleaning tool, shown as a drain auger 310, are shown. Drain auger 310 includes a tip portion 312, a body 314, a cable or coil 315 shown schematically in FIG. 20, and a handle 324. Cable 315 extends from handle 324 through the body 314 and tip portion 312 of the drain auger 310. Tip portion 312 is coupled to body 314 at a bottom or lower end. Tip portion 312 is formed from a flexible material (e.g., rubber, silicone, etc.). The flexible tip portion 312 allows for easier insertion into a fixture like a toilet bowl, while also preventing accidental damage (e.g., chipping, scratching, etc.).

Tip portion 312 includes a boot opening 325. In a specific embodiment, body 314 and/or boot opening 325 are sized to fully receive cable 315 which further helps prevent scratching of the toilet bowl. In a specific embodiment, cable 315 includes an end or bulb portion 344 (see e.g., FIG. 25) that can be used to break through or retrieve objects or debris (e.g., hair) causing blockage within a drain or pipes. In other embodiments, cable 315 may not include a bulb portion or may include another attachment tool at the distal end.

Cable 315 includes a flexible portion 316, a rigid portion 318 (see e.g., FIG. 25), and an angled portion 322. The end of cable 315 that includes angled portion 322 is coupled to handle 324. The opposing end of cable 315 is extended through an elongated tube or passageway within body 314 and tip portion 312 of drain auger 310. The combination of the flexible portion 316 and rigid portion 318 allow a user to fold drain auger 110 so that it has a reduced length for storage and/or transportation of the tool. While the flexible portion 316 facilitates the folding of cable 315, the rigid portion 318 ensures the user is able to generate enough force to break through a drain blockage.

To use drain auger 310, a user inserts the tip portion 312 into a plumbing fixture such as a toilet. The user can then turn handle 324 in a first direction while pushing downward (e.g., toward the toilet) to move cable 315 within body 314 and out of tip portion 312 through boot opening 325 so that cable 315 extends into the toilet and connected pipe system where there may be a blockage. Cable 315 can be pulled back and reextended as necessary using handle 324 until the blockage is opened or removed.

Figure 22:
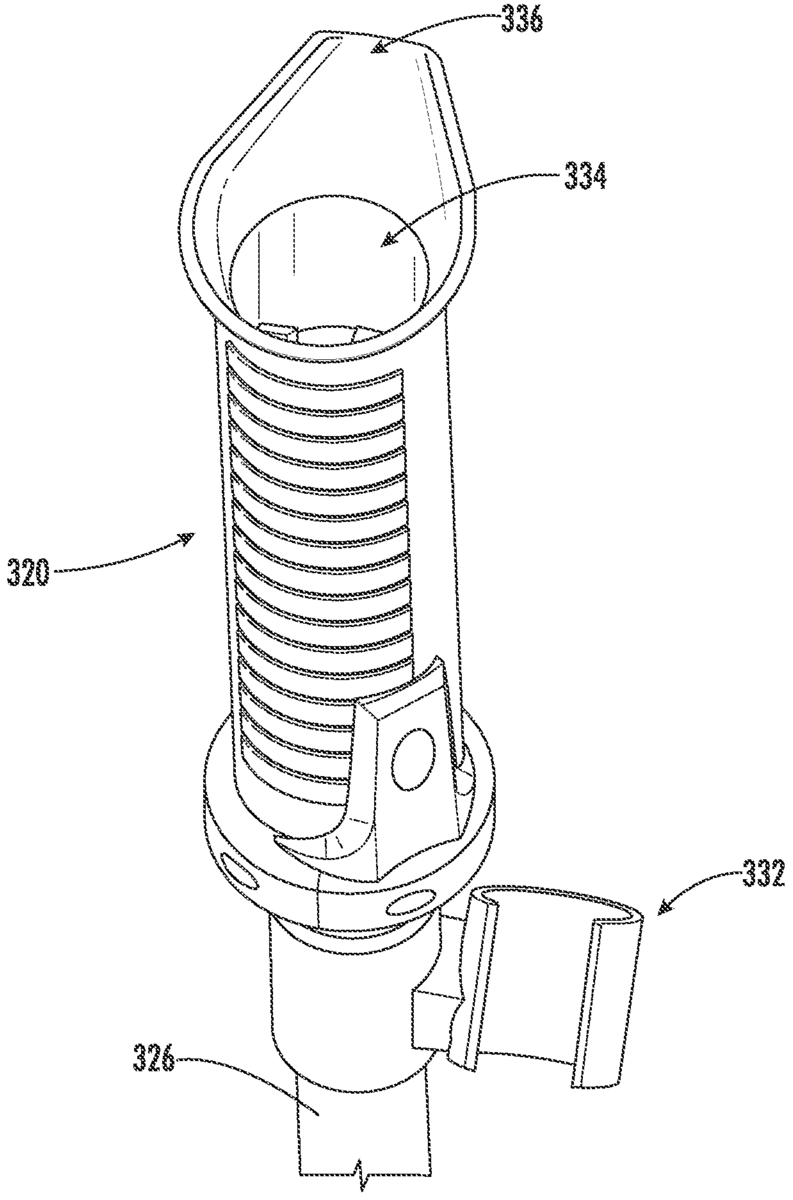
FIG. 22 is a perspective view of a top portion of the drain auger of FIG. 20, according to an exemplary embodiment.

Referring to FIG. 22, a perspective view of a top portion of drain auger 310 is shown, according to an exemplary embodiment. Once the blockage is removed, cable 315 can be retracted from the pipe system by rotating and/or pulling handle 324 upward (e.g., away from the toilet). Drain auger 310 can be easily cleaned after use. An upper end of body 314 of the drain auger 310 is coupled to a top portion 320 that acts a funnel. Top portion 320 includes slopped or angled portion 336. Angled portion 336 is configured to receive at least a portion of a hose or tubing. A hose can be placed in angled portion 336 of top portion 320 such that when water is turned on it is directed into body 314 so that any debris (e.g., the drain blockage) or liquid remaining from the drain cleaning process can be removed from drain auger 310. Top portion 320 further includes an opening 334 connected to the elongated tube or passageway within body 314. Top portion 320 and opening 334 are sized to allow for water to flow and/or be sprayed through body 314 and tip portion 312 during the cleaning process. Specifically, opening 334 is configured to allow for water to be sprayed through body 314 such that debris and/or liquid remaining within the passageway is removed (i.e., passageway is rinseable).

Figure 23:
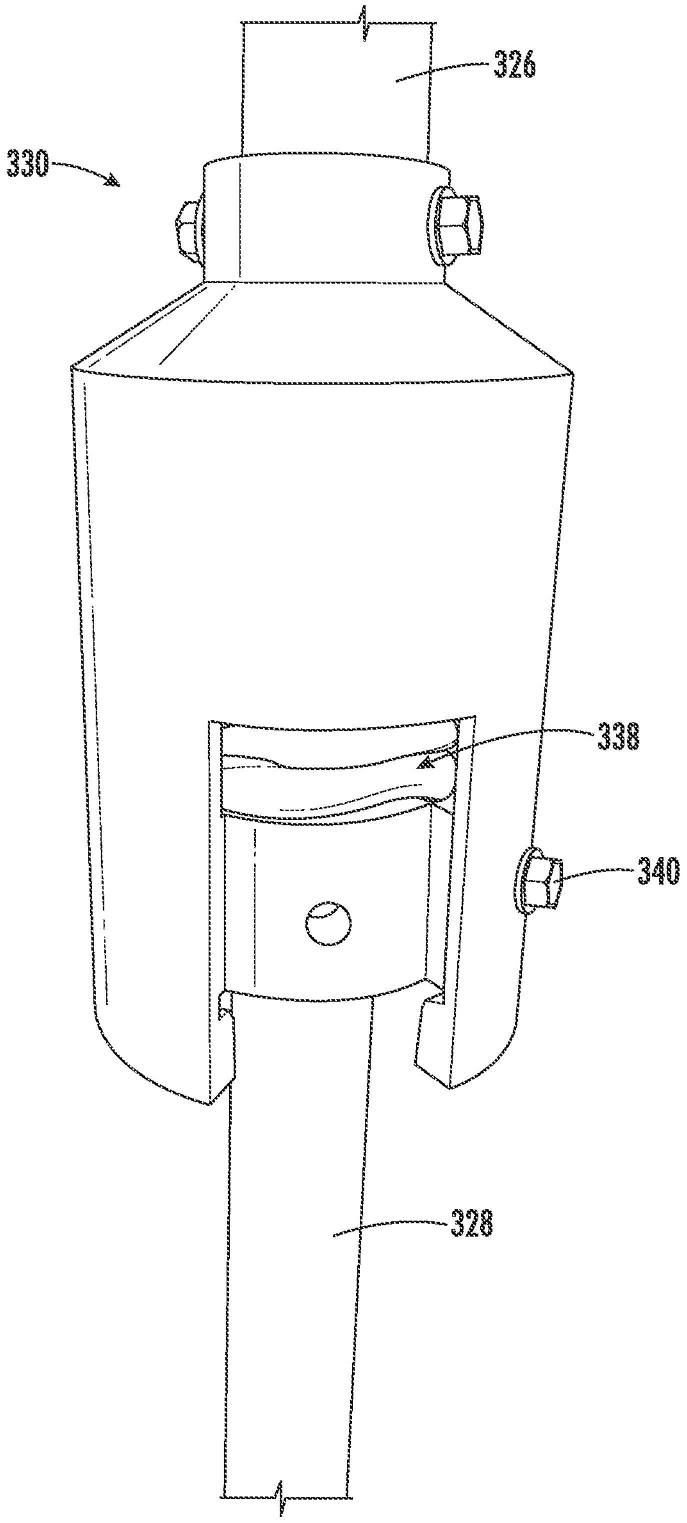
FIG. 23 is a perspective view of a coupler of the drain auger of FIG. 20, according to an exemplary embodiment.
Figure 24:
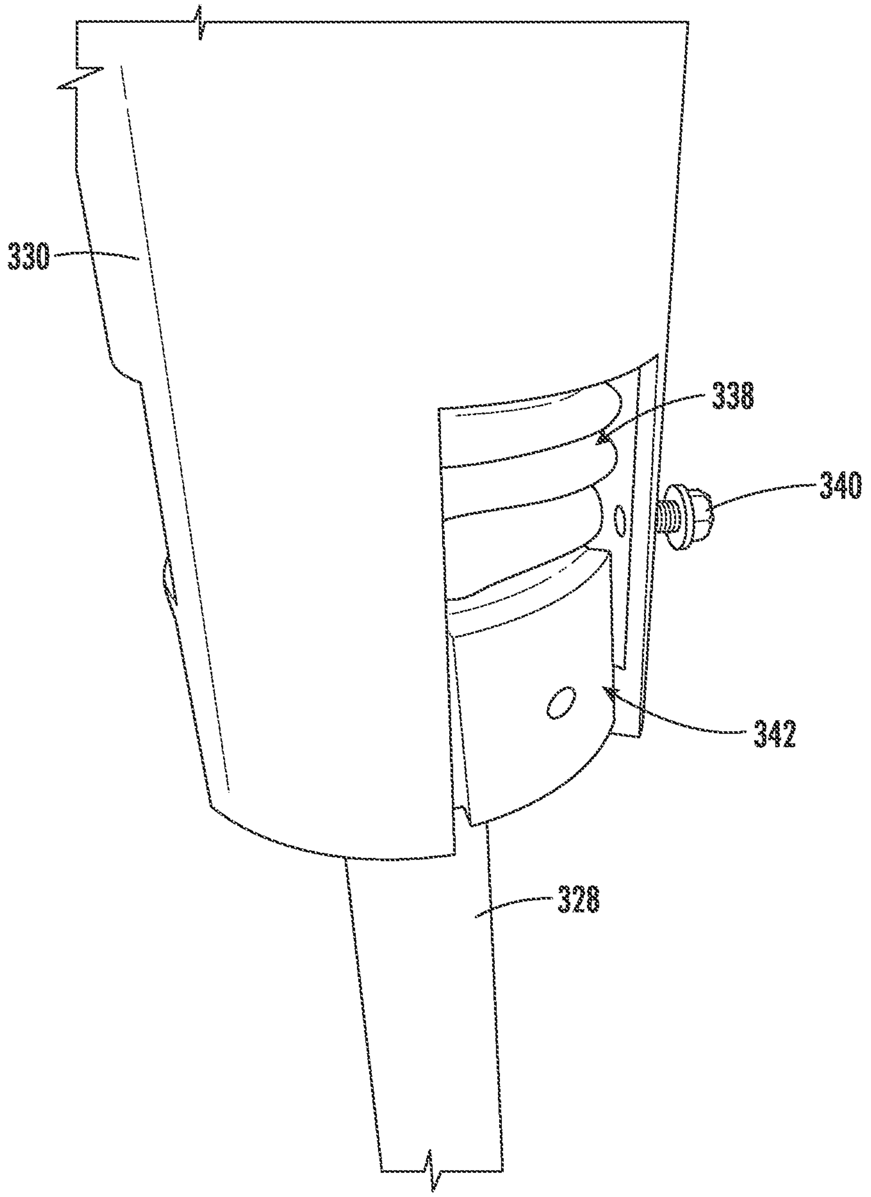
FIG. 24 is a perspective view of a coupler of the drain auger of FIG. 20, according to an exemplary embodiment.
Figure 25:
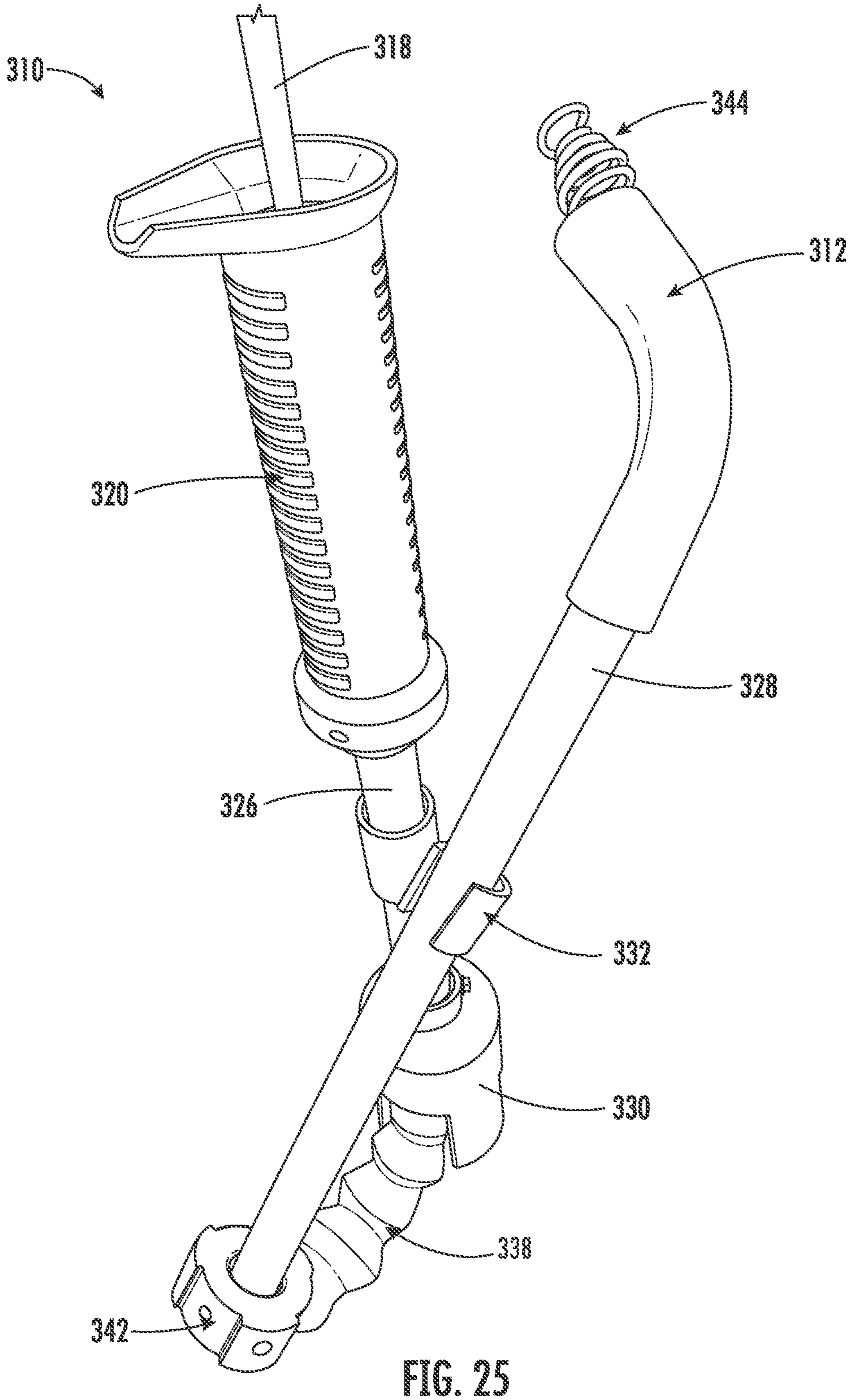
FIG. 25 is a perspective view of the drain auger of FIG. 20 in a folded position, according to an exemplary embodiment.

Referring to FIGS. 23-25, a folding mechanism that allows drain auger 310 to fold is shown, according to an exemplary embodiment. Body 314 of drain auger 310 includes an upper portion 326 and a lower portion 328. The folding mechanism includes a connector or coupler 330. Coupler 330 is positioned between and coupled to upper portion 326 and lower portion 328 of body 314. A tube 338 is at least partially positioned within coupler 330. Tube 338 is positioned between and connects to upper portion 326 and lower portion 328 of body 314. The connection between tube 338 and upper portion 326 and lower portion 328 of body 314 maintains the elongated tube or passageway within drain auger 310 such that the passageway is continuous between upper portion 326 and lower portion 328. In a specific embodiment, tube 338 is formed from a flexible material (e.g., rubber, silicone, etc.). In a specific embodiment tube 338 is formed from rubber.

Coupler 330 locks upper portion 326 and lower portion 328 of body 314 together. Specifically, the coupler rotates to lock the upper portion 326 and lower portion 328 together via rotational interlock. A pin 340 holds the coupler 330 in place so that it does not rotate and/or unlock. FIG. 23 shows pin 340 in a locked position (i.e., fully engaged with coupler 330) which prevents rotation of coupler 330. In FIG. 24, pin 340 is in an unlocked position (i.e., not fully engaged with coupler 330) that allows coupler 330 to rotate. Specifically, a bottom portion 342 of coupler 330 connected to a distal end (i.e., end near and/or adjacent to lower portion 328) of tube 338 is locked and/or held to the upper portion of coupler 330 by pin 340. A proximal end (i.e., near and/or adjacent to upper portion 326) of tube 338 is coupled to upper portion 326 and/or the upper section or body of coupler 330.

As shown in FIGS. 23-24, the tube 338 is in a compressed position within coupler 330 (when drain auger 310 is in the extended position). In FIG. 25, tube 338 is an extended position for transport and/or storage of drain auger 310. As discussed, when drain auger 310 has tube 338 in the extended position, any liquid and/or debris is held and/or trapped within tube 338 of drain auger 310 during transport (i.e., out of a house). In the extended position, tube 338 expands and a length between the upper portion 326 of the body 314 and lower portion 328 of the body 314 is increased. Specifically, a distance and/or length defined between a lowermost portion of upper portion 326 and an uppermost portion of lower portion 328 in the extended position is greater than a length and/or distance defined between a lowermost portion of upper portion 326 and an uppermost portion of lower portion 328 in the compressed position.

In the folded position, drain auger 310 has both open ends including top portion 320 and tip portion 312 pointed in a similar or the same direction (e.g., upward) for transport. Because opening 334 in top portion 320 and boot opening 325 are facing and/or pointed upward, any debris or liquid remaining after use of drain auger 310 will be positioned in tube 338 which is at a lower relative position. Opening 334 and boot opening 325 are positioned above and/or a location with a higher relative position than tube 338 such that gravity will result in any liquid and/or debris being retained within drain auger 310 during transport. In other words, when drain auger 310 is in the folded position, opening 334 is positioned above tube 338 and lower portion 328 of body 314 is positioned with exit or boot opening 325 above tube 338 such that debris or liquid within body 314 will move into tube 338.

In other words, when the drain auger 310 is in the extended position, a distance between a first end of the tube 338 and a second end of the tube 338 defines a first length and when the drain auger 310 is in the folded position, a distance between the first end of the tube 338 and a second end of the tube 338 defines a second length. In a specific embodiment, the second length is greater than the first length.

Drain auger 310 further includes one or more retention components, shown as a clip 332. Clip 322 is coupled to upper portion 326 of body 314. Clip 332 includes retention arms that extend outward. The arms extend at least partially around body 314, specifically lower portion 328. In a specific embodiment, clip 332 is positioned at an angle relative to a longitudinal axis of drain auger 310 and/or upper portion 326. When the drain auger 310 is folded, the tip portion 312 is positioned above clip 332. When clip 332 is coupled to lower portion 328 of body 314, lower portion 328 is positioned at an angle relative to the longitudinal axis of drain auger 310. When drain auger 310 is in the folded position, tube 338 is extended and/or bent such that lower portion 328 is positioned extending tard upper portion 326 and/or top portion 320 and the retention arms of the clip 322 engage an outer sidewall of the lower portion 328 of body 314.

In other words, when the folding mechanism is in the extended position, upper portion 326 of body 314 and lower portion 328 of body 314 are aligned (i.e., longitudinal axis of upper portion 326 and lower portion 328 are collinear) along the longitudinal axis of drain auger 310. When the folding mechanism is in the folded position, lower portion 328 is rotated into a position where upper portion 326 of body 314 and lower portion 328 of body 314 are not aligned (i.e., longitudinal axis of upper portion 326 and lower portion 328 are not collinear) along the longitudinal axis of drain auger 310.

In a specific embodiment, a total or extended length of the drain auger is about 6 feet (e.g., 6 feet plus or minus 6 inches). In such an embodiment, a folded length of drain auger 310 is less than 6 feet.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A drain cleaning tool comprising:

a drum;

an elongated tube extending from the drum along a longitudinal axis of the drain cleaning tool, the elongated tube including an opening at a distal end from the drum;

a cable lock assembly coupled to the distal end of the elongated tube, the cable lock assembly comprising:

a tip portion including:

a first end positioned at the distal end of the elongated tube; and a second end opposing the first end, the second end including an exit opening; and an actuator rotatably engaged with the tip portion and extending along the longitudinal axis of the drain cleaning tool;

a cable stored within the drum and configured to extend through the elongated tube and the tip portion; and an actuator channel extending between opposing ends of the actuator along the longitudinal axis of the drain cleaning tool such that when the actuator channel is aligned with elongated tube, the cable is moveable within the actuator channel and wherein, when the actuator channel is offset from the elongated tube by a distance, the cable is pressed between an inner surface of the actuator channel and an inner surface of the elongated tube to fix a position of the cable;

wherein the actuator is rotatable about the longitudinal axis of the drain cleaning tool between an unlocked position in which the cable is moveable with respect to the tip portion and a locked position in which the cable is fixed with respect to the tip portion.

2. The drain cleaning tool of claim 1, wherein the tip portion includes a locking channel extending along a longitudinal axis of the tip portion, the locking channel positioned at one of the opposing ends of the actuator.

3. The drain cleaning tool of claim 2, wherein the locking channel is centered around a longitudinal locking axis, the longitudinal locking axis extending in a parallel direction and offset a distance from the longitudinal axis of the tip portion, the offset of the locking channel creating an interference point such that the cable is pressed against the inner surface of the elongated tube to prevent rotational and axial movement of the cable.

4. The drain cleaning tool of claim 1, further comprising a spinning handle coupled to a rear surface of the drum, the spinning handle rotatable about the longitudinal axis of the drain cleaning tool to recoil the cable into the drum.

5. The drain cleaning tool of claim 4, wherein the spinning handle includes a grip portion and is moveable between a crank position where the grip portion extends away from the drum for a user to grasp and a storage position where the grip portion extends toward the drum such that the spinning handle defines a flat surface extending along the drum.

6. A drain cleaning tool comprising:

a drum;

an elongated tube extending from the drum along a longitudinal axis of the drain cleaning tool, the elongated tube including an opening at a distal end from the drum;

a cable lock assembly coupled to the distal end of the elongated tube, the cable lock assembly comprising:

a tip portion including:

a first end positioned at the distal end of the elongated tube; and a second end opposing the first end, the second end including an exit opening; and an actuator rotatably engaged with the tip portion, the actuator including an actuator channel extending along the longitudinal axis of the drain cleaning tool; and a cable positioned within the drum and configured to extend through the elongated tube and the exit opening into a drain;

wherein the actuator is rotatable about the longitudinal axis of the drain cleaning tool between an unlocked position in which a longitudinal actuator axis is collinear with the longitudinal axis of the drain cleaning tool such that the cable is movable within the actuator channel and a locked position in which the longitudinal actuator axis is parallel to and not collinear to the longitudinal axis of the drain cleaning tool such that the cable is pressed between an inner surface of the actuator channel and an inner surface of the elongated tube to lock the cable in place.

7. The drain cleaning tool of claim 6, wherein the tip portion includes a pair of locking channels extending along a longitudinal axis of the tip portion, the pair of locking channels positioned on opposing sides of the actuator.

8. The drain cleaning tool of claim 7, wherein the pair of locking channels are centered around a longitudinal locking axis, the longitudinal locking axis extending in a parallel orientation and offset a distance from the longitudinal axis of the tip portion, the offset of the pair of locking channels creating an interference point such that the cable is pressed against the inner surface of the elongated tube to lock the cable in place.

9. The drain cleaning tool of claim 8, wherein, when the actuator is in the unlocked position both the actuator channel and pair of locking channels are aligned with the elongated tube.

10. The drain cleaning tool of claim 8, wherein a distance that the actuator channel is offset from the longitudinal axis of the drain cleaning tool is the same as the distance the pair of locking channels are offset and wherein the offset of the actuator channel is in a first direction relative to the longitudinal axis of the tip portion and the offset of the pair of locking channels is in first direction relative to the longitudinal axis of the tip portion.

11. The drain cleaning tool of claim 10, wherein, when the actuator is in the locked position a total distance offset is equal to the distance of the actuator channel offset plus the distance the pair of locking channels are offset.

12. The drain cleaning tool of claim 6, further comprising an adjustable support handle positioned between the drum and the tip portion, the adjustable support handle configured to allow for 360-degree rotation about an axis of rotation, the axis of rotation extending in a generally perpendicular direction to the longitudinal axis of the drain cleaning tool.

* * * * *